US008699371B2

(12) United States Patent
Reidl et al.

(10) Patent No.: US 8,699,371 B2
(45) Date of Patent: Apr. 15, 2014

(54) SELF SYNCHRONIZING DATA COMMUNICATION METHOD AND DEVICE

(75) Inventors: Christian Reidl, Villach (AT); Wolfgang Scherr, Villach/Landskron (AT); Stefan Kampfer, Neu-Feffernitz (AT)

(73) Assignee: Infineon Technologies AG, Neubiberg (DE)

( * ) Notice: Subject to any disclaimer, the term of this patent is extended or adjusted under 35 U.S.C. 154(b) by 188 days.

(21) Appl. No.: 13/273,344

(22) Filed: Oct. 14, 2011

(65) Prior Publication Data

US 2013/0094373 A1   Apr. 18, 2013

(51) Int. Cl.
    H04L 12/26   (2006.01)
(52) U.S. Cl.
    USPC ............................ 370/252; 370/310; 370/229
(58) Field of Classification Search
    USPC .......................................... 370/252, 310, 229
    See application file for complete search history.

(56) References Cited

U.S. PATENT DOCUMENTS

| 4,159,448 A | 6/1979 | Parham |
| 5,210,846 A | 5/1993 | Lee |
| 5,751,775 A | 5/1998 | Fensch et al. |
| 2008/0122426 A1* | 5/2008 | Prestros ..................... 324/76.12 |
| 2009/0257319 A1* | 10/2009 | Henzler ....................... 368/113 |
| 2012/0131184 A1* | 5/2012 | Luna et al. ..................... 709/224 |

OTHER PUBLICATIONS

Maxim 1-Wire Communication With a Microchip PICmicro Microcontroller. Sep. 16, 2003. 8 Pages.
Awtrey, Dan. "The 1-Wire Weather Station." Dallas Semiconductor. Jun. 1998. 6 Pages.
Discussion Forum. Retrieved from http://dics.voicecontrol.ro/process mails/arata discutia/129197/Implementing 1-wire slaves.html Sep. 23, 2010. 10 Pages.

* cited by examiner

*Primary Examiner* — Dang T Ton
*Assistant Examiner* — Mewale Ambaye
(74) *Attorney, Agent, or Firm* — Eschweiler & Associates, LLC

(57) ABSTRACT

A method of receiving a data transmission includes detecting a first switching of a transmission signal to a first signal value, starting a duration measurement of a first time interval that begins with detecting the first switching of the transmission signal, detecting a second switching of the transmission signal to a second signal value, stopping the measurement of the first time interval duration and starting a second duration measurement of a second time interval, detecting a third switching of the transmission signal to the first signal value or to a third signal value, stopping the second measurement in response to detecting the third switching, determining a relation of the first and second time interval durations from the first and second measurements, and determining a data value of the transmission signal based on the determined relation.

28 Claims, 22 Drawing Sheets

SELF SYNCHRONIZING DATA COMMUNICATION METHOD AND DEVICE

FIELD

Embodiments of the present invention relate to a method of receiving a data transmission, a method of data transmission, and a data communication device. Some embodiments of the present invention relate to data transmission over a (single) communication line using pulse width modulation.

BACKGROUND

Electronic systems may be composed of a plurality of sub-modules or components that may be connected to each other via wires, cables, conductive traces (in the case of printed circuit boards or semiconductor chips), etc.

Some components only have a small number of pins that can be used for a transmission of information to and/or from the component. On some occasions it may be desired to facilitate an access to the component for a diagnosis module in an easy manner, i.e. the access from the diagnosis module to the component requiring the establishment of a few connections only, but nevertheless enabling a transmission of information to the component as well as receiving (or reading out) information from the component.

Such an ability to communicate with the component may be desirable in order to, e.g. activate test modes of an integrated circuit, inspect or debug component internals, to (initially) configure and/or calibrate the component (for example by means of e-fuses, an electrically erasable programmable read only memory (EEPROM) or other one-time-programmable (OTP) or programmable functions), or to enable a client (a buyer or user of the component) to perform a parameterization of the component himself/herself.

In view of these situations requiring a communication with the component it may be desirable to keep the number of connections small in order to design the integration of the component as easily as possible for a client-specific application, or to facilitate a use of the component with products having a low number of pins or products that cannot afford to use many pins dedicated to this purpose.

SUMMARY

Embodiments of the present invention provide a method of receiving a data transmission. The method comprises detecting a first switching of a transmission signal to a first signal value, the first switching corresponding to an edge of the transmission signal. The method further comprises starting a measurement of a duration of a first time interval that begins with the detecting of the first switching of the transmission signal. Furthermore, the method of receiving a data transmission comprises detecting a second switching of the transmission signal to a second signal value, stopping the measurement of the duration of the first time interval and starting a second measurement of a duration of a second time interval. The method comprises detecting a third switching of the transmission signal to the first signal value or a third signal value and stopping the second measurement in response to detecting the third switching. Furthermore, the method comprises determining a relation of the durations of the first and second time intervals from the first and second measurements and determining a data value of the transmission signal based on the relation of the durations of the first and second time intervals.

Further embodiments of the present invention provide a method of data transmission. The method of data transmission comprises setting a cycle duration for an upcoming transmission of a data value by a transmission equipment, determining a relation between durations of a first time interval and a second time interval based on the data value to be transmitted, and determining the duration of the first time interval and the second time interval based on the cycle duration and the relation. Furthermore, the method of data transmission comprises switching a transmission signal to a first signal value to create an edge of the transmission signal, holding the first signal value during the first time interval, and switching the transmission signal to a second signal value to create another edge of the transmission signal. The method also comprises holding the second signal value during the second time interval and switching the transmission signal to the first signal value or a third signal value to indicate an end of the second time interval to a reception equipment configured to detect the edges of the transmission signal caused by the switching of the transmission signal.

Further embodiments of the invention provide a data communication device comprising a transmission signal input, an edge detector, a counter, a state machine and a counter evaluator. The transmission signal input is configured to receive a transmission signal emitted by a remote data communication device. The edge detector is configured to detect at least one of a leading edge and a trailing edge of a signal value of the transmission signal. The counter is configured to count in a first direction upon reception of a leading edge and to count in a second direction opposite to the first direction upon reception of a trailing edge. The state machine is configured to identify at least a first time interval and a second time interval of a pulse width modulation cycle, the first time interval being delimited by a leading edge and a trailing edge and the second time interval being delimited by the trailing edge and a further leading edge, or vice versa. The counter evaluator is configured to determine whether a counter value of the counter at an end of the second time interval is above or beneath an initial counter value at the start of the first time interval. The counter evaluator is further configured to derive a data value to be transmitted from the remote data communication equipment to the data communication equipment from the fact that the counter value at the end of the second time interval is above or beneath the initial counter value.

Further embodiments of the invention provide a data communication device comprising a transmission signal input, an edge detector, a duty cycle evaluator, and a data value provider. The transmission signal input is configured to receive a transmission signal emitted by a remote data communication device. The edge detector is configured to detect at least one of a leading edge and a trailing edge in the transmission signal. The duty cycle evaluator is configured to receive an edge detection information from the edge detector enabling a determination of a relation of a duration of a first time interval and of a duration of a second time interval of a pulse width modulation cycle within the transmission signal. The duty cycle evaluator is further configured to determine a duty cycle information based on the durations of the first and second time intervals. The data value provider is configured to provide a data value transmitted to the data communication device via the transmission signal based on the determined duty cycle information.

Further embodiments of the invention provide a data communication device comprising a means for receiving a transmission signal emitted by a remote data communication device, a means for detecting an edge in the transmission signal, and a means for determining a duty cycle of a pulse width modulation cycle within the transmission signal based on an edge detection information provided by the means for detecting an edge. The duty cycle is representative of a ratio of durations of two time intervals that are delimited by edges within the transmission signal. The data communication device further comprises a means for determining a relation of the duty cycle and a threshold and a means for providing a data value transmitted to the data communication device via the transmission signal based on the determined relation of the duty cycle and the threshold.

Further embodiments of the invention provide a data communication device comprising a data value input, a cycle duration setting device, a duty cycle determiner, a time interval duration determiner, and a transmission signal switching device. The data value input is configured to receive a data value to be transmitted by the data communication device. The cycle duration setting device is configured to set a cycle duration for an upcoming transmission of a data value by a transmission equipment. The duty cycle determiner is configured to determine a duty cycle of a pulse width modulation cycle, the duty cycle corresponding to the data value to be transmitted and indicating a ratio of a first time interval duration and a second time interval duration. The time interval duration determiner is configured to determine the durations of the first time interval and the second time interval based on the determined duty cycle and the determined cycle duration. The transmission signal switching device is configured to switch a transmission signal from a first signal value to a second signal value and vice versa. The transmission signal switching device is controlled by the time duration determiner with respect to the durations of the first time interval and the second time interval. The first time interval is between a first switching event and a second switching event performed by the transmission signal switching device. The second time interval is between the second switching event and a third switching event performed by the transmission signal switching device.

BRIEF DESCRIPTION OF THE DRAWINGS

Embodiments of the present invention will be described in more detail using the accompanying figures, in which.

DETAILED DESCRIPTION

Before embodiments of the present invention will be described in detail, it is to be pointed out that the same or functionally equal elements are provided with the same reference numbers and that a repeated description of elements provided with the same reference numbers is omitted. Furthermore, some functionally equal elements may also be provided with similar reference numbers wherein the two last digits are equal. Hence, descriptions provided for elements with the same reference numbers or with similar reference numbers are mutually exchangeable, unless noted otherwise.

For many applications involving a communication with a component or sub-module of an electronic system a flexible timing behavior would be desirable making it possible to react, on the one hand, to the transmission quality (long transmission lines, parasitic and actual (real) components having an influence on the transmission rate, etc.) and, on the other hand, large oscillator differences or time-base differences between the components (for example, in order to establish a communication with a component the oscillator of which has not yet been trimmed and/or calibrated). The teachings disclosed herein relate to a data communication allowing a flexible timing and/or to a self synchronizing full duplex single wire bidirectional interface. The data communication may possibly be bidirectional and/or performed on a single line only (this signal line typically being in addition to a line for providing a reference potential between the devices participating in the communication, such as a ground potential).

Furthermore, a robust communication may be desired with little or no impact on the timing requirements of the components involved, as stable clock sources are not necessarily available in, for example, low cost components.

Figure 1:
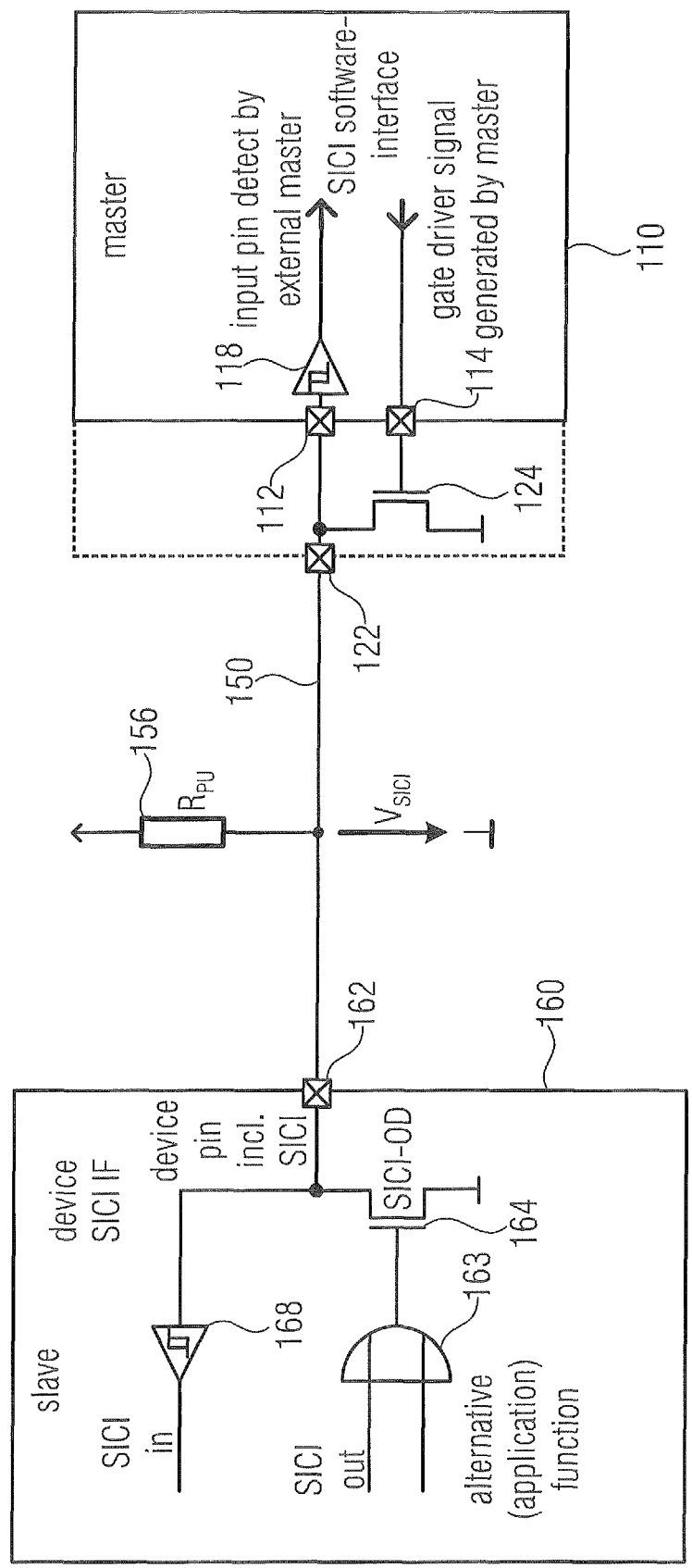
FIG. 1 shows a schematic wiring diagram of two components and a connection between the two components for data transmission purposes.

FIG. 1 shows a schematic wiring diagram of two components and a connection between the two components for data transmission purposes, wherein the connection provides a serial inspection/configuration interface (SICI). In the situation illustrated in FIG. 1, one of the two components is configured to function as a master component 110 and the other one of the two components is configured to function as a slave component 160. The definition of one of the two components being the master component and the other component being the slave component may be hardwired, configurable, fixed, predefined, or dynamic. In the dynamic case each component of the two components may, at a given time and/or under specific circumstances, temporarily function as the master component while the other component(s) function(s) as the slave component(s), and vice versa.

The master component 110 and the slave component 160 are connected to each other by means of a connection 150. In the embodiment shown in FIG. 1 the connection 150 comprises an electrical conductor. In other embodiments the connection 150 may be a capacitive connection (capacitive coupling), an inductive connection (inductive coupling), an optical connection, or some other type of connection. The connection 150 extends between an input 112 of the master component 110 and an input/output 162 (labeled "device pin incl. SICI") of the slave component 160. The transmission signal input 112 of the master component 110 is used during a data transmission from the slave to the master and is configured to receive a transmission signal emitted by a remote data communication device, i.e. the slave component 160. For a data transmission from the master 110 to the slave 160 the input/output 162 of the slave component 160 functions as a transmission signal input that is also configured to receive a transmission signal emitted by a remote data communication device, i.e., the master 110 in this case. The connection 150 is typically capacitively coupled to a ground potential (not illustrated in FIG. 1, see for example FIG. 13). This capacitive coupling is usually caused by parasitics on the electrical conductor forming the connection 150. Nevertheless, a dedicated capacitor may be provided, as well, for example to smooth or stabilize a voltage $V_{SICI}$ between the electrical conductor 150 and the ground. The electrical conductor of the connection 150 is also connected to an electrical supply potential via a pull-up resistor $R_{PU}$ with the reference sign 156. The pull-up resistor 156 prevents the occurrence of an undefined electrical potential (floating potential) on the electrical conductor of the connection 150 when the electrical conductor is floating at the input 112 of the master component 110 and also at the input/output 162 of the slave component 160. In this situation the pull-up resistor 156 pulls the potential on the electrical conductor of the connection 150 substantially to the supply voltage as no electrical current flows across the pull-up resistor 158. At the same time, the (parasitic) capacitance between the electrical conductor and the ground potential is charged approximately to the supply voltage. Thus, the electrical conductor has a default electrical potential corresponding to a particular transmission signal value (e.g., a logical "0" in the case of a binary transmission). In the alternative to what is shown in FIG. 1 and has been described above, the master component 110 could comprise a pull-down resistor and a switching element connected between the electrical conductor of the connection and the supply potential. Accordingly, the default potential of the electrical conductor would be the ground potential (due to the action of the pull-down resistor) and the switching element would be configured to selectively pull the potential of the electrical conductor to the supply voltage.

The signal value may be represented by a voltage level, an electrical current level or magnitude, a frequency burst, a dual-tone multi-frequency signal (e.g., DTMF), an emission of radiation having a specific property (e.g., a specific wavelength), or other physical quantities. For example, the magnitude of an electrical current may be varied between two levels, each level representing one signal value.

The master component 110 further comprises an input amplifier 118, for example a Schmitt trigger, which is connected to the input 112. The input amplifier 118 functions as an edge detector that is configured to detect at least one of a leading edge, a trailing edge, a rising edge, and a falling edge of a signal value of the transmission signal. An output of the input amplifier 118 indicates a logical SICI level detected by the master 110 and corresponding to a voltage on the connection 150 referred to the ground potential. In particular, the output of the input amplifier 118 may be regarded as a binary representation of the voltage $V_{SICI}$ on the electrical conductor of the connection 150. The input 112 and the input amplifier 118 of the master component 110 are optional and therefore not present in some embodiments of the teachings disclosed herein in which the master component 110 only sends information to the slave component 160 (unidirectional communication). If present, the input 112 and the input amplifier 118 of the master component 110 are configured to detect an incoming transmission signal on the electrical conductor of the connection 150, the incoming transmission signal being produced by a remote data communication device such as the slave component 160. In this manner, the master component 110 may receive a data transmission from the slave component 160 in case a bidirectional communication between the master component 110 and the slave component 160 is desired and implemented.

For a data transmission from the master component 110 to the slave component 160 the master component 110 comprises an output 114 configured to output a gate driver signal generated by the master component 110. The gate driver signal is applied to a gate of a field effect transistor 124 functioning as a switching element or output driver for the transmission signal that is conducted from the master component 110 via the electrical conductor of the connection 150 to the slave component 160. Instead of a field effect transistor, other switching elements may be used, as well. In the embodiment illustrated in FIG. 1 a drain terminal of the field effect transistor 124 is connected to the electrical conductor 150 and a source terminal of the field effect transistor 124 is connected to the ground potential. FIG. 1 illustrates two possible configurations of the master component 110. A first configuration is indicated by a box drawn in full stroke and a second configuration comprises an extension to the first configuration indicated by a box drawn in dashed line. According to the first configuration in which the box drawn in dashed line does not belong to the master component 110, the field effect transistor 124 is an external component with respect to the master component 110. Accordingly, the master component 110 provides a control signal (i.e. the gate driver signal) to the field effect transistor 124. The output 114 may be regarded as a transmission signal switching device configured to cause a switching of the transmission signal from a first signal value to a second signal value and vice versa. The field effect transistor 124 may be regarded as a switching element which executes the actual switching event as controlled by the gate driver signal provided by the output 114 to the gate of the field effect transistor 124.

The slave component 160 comprises an input amplifier 168, an input of which is connected to the input/output 162. The input amplifier 168 typically functions as an edge detector that is configured to detect at least one of a leading edge, a trailing edge, a rising edge, and a falling edge of a signal value of the transmission signal. At an output of the input amplifier 168 (for example, a Schmitt trigger) a binary representation of the transmission signal is available for further processing. The output signal "SICI in" of the input amplifier 168 may be provided, for example, to a decoder comprising a counter, a state machine, and a counter evaluator, as will be explained below. In an alternative embodiment the output signal "SICI in" of the input amplifier may be forwarded to a circuit comprising an edge detector, a duty cycle evaluator, and a data value provider. The input/output 162 is also connected to a drain terminal of a field effect transistor 164 which is part of the slave component 160 and configured to function as an output driver (SICI-OD). The field effect transistor 164 has a similar role as the field effect transistor 124 controlled by the gate driver signal generated by the master component 110. In particular, the field effect transistor 164 is configured to switch a transmission signal on the electrical conductor 150 from a first signal value to a second signal value (and vice versa) during a data transmission from the slave component 160 to the master component 110. The gate of the field effect transistor 164 is connected to an output of a logical OR-gate 163. A first input for the OR-gate 163 is a SICI out signal, i.e. the data value(s) to be transmitted from the slave component 160 to the master component 110. Another input for the OR-gate 163 is a signal provided by an alternative (application) function, e.g., a Fast OverCurrent (FOC) functionality or a test/debug signal generated during a test/debug mode of the device 160.

Referring again to the master component 110, the field effect transistor 124 of the master component 110 typically functions as a transmission signal switching element and may belong to a transmission signal switching device. During a data transmission from the master component 110 to the slave component 160 the field effect transistor 124 may be brought into a conducting state by means of a suitable gate driver signal generated by the master component 110, for example by a gate-source voltage of the field effect transistor 124 being greater than a threshold voltage $V_{th}$ of the field effect transistor 124. The gate driver signal may be generated by a combination of a data value input, cycle duration setting device, a duty cycle determiner, and a time interval duration determiner (not shown). The data value input is configured to receive a data value to be transmitted by the data communication device, i.e. the master component 110. The data value to be transmitted may be provided via a SICI software interface, for example. The cycle duration setting device is configured to set a cycle duration for an upcoming transmission of a data value by the master component. The duty cycle determiner is configured to determine a duty cycle of a pulse width modulation cycle, the duty cycle corresponding to the data value to be transmitted. This means that the various possible logical values of the data to be transmitted (e.g. logical "0" and logical "1") are mapped to corresponding duty cycles (e.g. approximately 33% and approximately 66%, respectively), which indicate a relation or a ratio of a first time interval duration and a second time interval duration. The relation of the first and second time interval durations may simply indicate whether the first time interval is longer than the second time interval, or vice versa. The time duration determiner is configured to determine the durations of the first time interval and the second time interval based on the determined duty cycle and the determined cycle duration. Furthermore, the time duration determiner controls the transmission signal switching device and in particular the field effect transistor 124.

In the conducting state the field effect transistor 124 substantially provides a short circuit between the electrical conductor 150 and the ground potential. The corresponding electrical potential or voltage on the electrical conductor 150 (approximately 0V referred to the ground potential) may be regarded as a first signal value of the transmission signal. By varying the gate driver signal the field effect transistor 124 may be brought into a blocking state (non-conducting state) so that substantially no electrical current flows through the field effect transistor 124. Unless the electrical conductor 150 is connected to a defined electrical potential at another location or by means of another component, the pull-up resistor 156 pulls the electrical voltage $V_{SICI}$ of the electrical conductor 150 close to the supply voltage, thereby charging the capacitance between the electrical conductor and the ground. The voltage $V_{SICI}$ of the electrical conductor 150 in this state may represent a second signal value of the transmission signal. During a data transmission from the master component 110 to the slave component 160 the field effect transistor 164 of the slave component 160 is typically in a blocking state. Therefore, the input amplifier 168 of the slave component 160 may detect the signal value of the transmission signal on the electrical conductor 150 and provide a corresponding data value at its output as the SICI-in signal.

During a data transmission from the slave component 160 to the master component 110, the field effect transistor 164 of the slave component 160 is controlled by the output signal of the OR-gate 163 which is based on the signal SICI-out representing the data values to be transmitted. Thus, the field effect transistor 164 influences the signal value of the (reply) transmission signal on the electrical conductor 150. This signal may then be detected by the input amplifier 118 of the master component 110 and converted by the input amplifier 118 to a corresponding binary signal representative of the SICI level detected by the master component 110.

The data transmission from the master component 110 to the slave component 160 takes place using a pulse width modulation (PWM). The pulse width modulation already defines the timing for the (subsequent) data transmission from the slave component 160 to the master component 110. The slave component 160 is configured to decode both the pulse width modulated data transmission from the master component 110 to the slave component 160 and determine the timing for the reverse data transmission from the slave component 110 to the master component 160. To this end, the slave component 160 may use a single counter and a small state machine, as will be explained below.

In the following, a number of different configurations and implementations of the master component 110, the slave component 160, and the connection 150 are discussed. A transmission signal output of the master component 110 or the slave component 160 may be configured to be connected to a remote data communication device via an electrical connection, wherein an electrical potential on the electrical connection is representative of the transmission signal. The transmission signal switching device may comprise a switching element 124, 164 configured to selectively apply an electrical potential on the electrical connection in response to a switching element control signal based on the duty cycle determined by the duty cycle determiner. The switching element may be connected between the electrical connection and a reference potential, and a pull-up resistor (or a pull-down resistor) may be connected between the electrical connection and a supply potential so that the switching element is configured to apply the reference potential on the electrical connection when the switching element is in a conducting state and that the supply potential is applied on the electrical connection due to an action of the pull-up resistor when the switching element is in a non-conducting state.

The master component 110 and/or the slave component 160 may further comprise a timer configured to provide a time base for the data communication device. The duty cycle determiner may be configured to determine the durations of the first and second time intervals to be multiples of a basic time unit provided by the timer.

The master component 110 and/or the slave component 160 may further comprise a transmission signal input configured to receive an arriving transmission signal from a remote data communication device and determine a signal value of the arriving transmission signal. The duty cycle determiner may be further configured to enable the transmission signal input during a third time interval subsequent to the second time interval in order to receive and process a data communication within the arriving transmission signal from the remote data communication device to the data communication device. The duty cycle determiner may be further configured to determine a duration of the third time interval as a function of the durations of the first and second time interval.

The master component 110 and/or the slave component 160 may further comprise a programming voltage generator configured to generate a programming voltage for an electrically erasable programmable read-only memory (EEPROM), the electrically erasable programmable read-only memory being associated to a remote data communication device which is connected to the data communication device by means of an electrical connection. The programming voltage generator and the transmission signal switching element may both be connected to the electrical connection between the data communication device and the remote data communication device so that the electrical connection is shared between data communication purposes and purposes of programming the electrically erasable programmable read-only memory.

The master component 110 may further comprise a polling request generator configured to generate a polling request to at least one remote data communication device, the polling request comprising a specific data value pattern to be processed by the duty cycle determiner for providing a corresponding control signal sequence to the transmission signal switching device, the control signal sequence comprising a plurality of data values to be transmitted successively. The master component 110 may further comprise a polling response evaluator configured to receive and evaluate a polling response from the at least one remote data communication device, the polling response indicating whether the at least one remote data communication device has data available to be communicated from the at least one remote data communication device to the data communication device.

Figure 2:
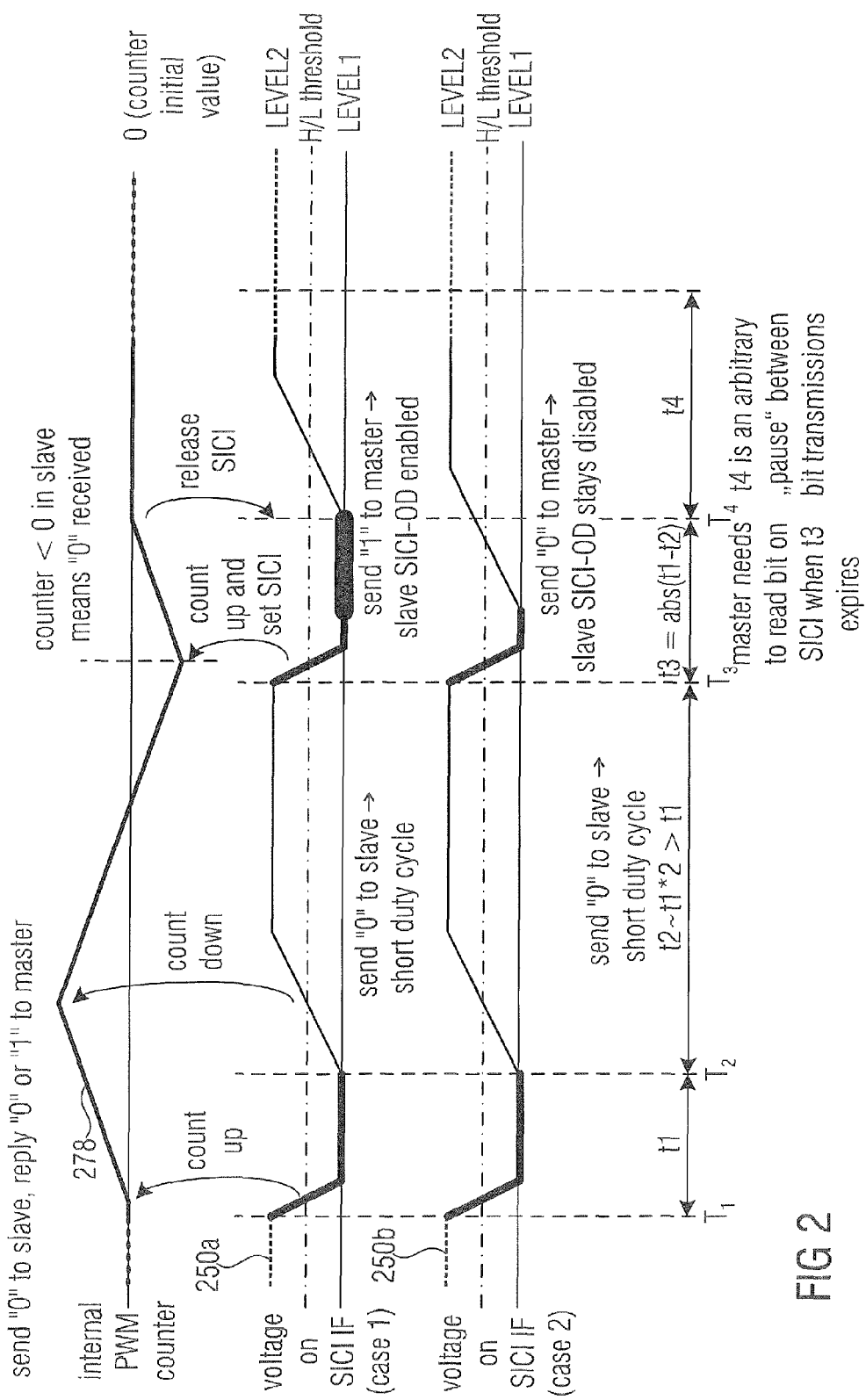
FIG. 2 illustrates the transmission of one bit from a master component, the decoding of the same by a slave component, and the response of one bit from the slave component to the master component.

FIG. 2 illustrates the transmission of one bit from the master component 110, the decoding of the same by the slave component 160, and the response of one bit from the slave component 160 to the master component 110. FIG. 2 illustrates two cases. In both cases a "0" is sent from the master component 110 to the slave component 160. In the first case the slave replies with a logical "1" to the master, and in the second case the slave replies with a logical "0".

A waveform 250a shown in FIG. 2 illustrates the voltage on the SICI pin 162 of the slave component 160 and thus the voltage on the electrical conductor of the connection 150, in the first case. The voltage 250a may be influenced by three different elements, namely the output driver 124 of the master component 110, the output driver 164 of the slave component 160, and the pull-up resistor 156. In order to illustrate which one of these elements currently controls the voltage 250a primarily, different line thicknesses have been used. A thick line indicates that the output driver 164 controls the voltage 250a. A medium thick line indicates that the output driver 124 controls the voltage 250a. A thin line indicates that the pull-up resistor 156 controls the voltage 250a. The same illustration scheme is used for the voltages 250b, 350a, and 350b in FIGS. 2 and 3.

At the beginning of the transmission of one data bit from the master 110 to the slave 160 it is assumed that the voltage 250a is at or close to a second level (LEVEL2), e.g. the supply voltage Vdd. At a time instant $T_1$ the voltage 250a on the SICI pin begins to decrease which is caused by bringing the output driver 124 in a conducting state. Shortly after the time instant $T_1$ the voltage 250a falls below a high/low threshold (H/L threshold). This forms a falling edge of the voltage 250a, i.e. of the transmission signal, which can be detected by the input amplifier 168 of the slave component 160. The falling edge of the transmission signal represented by the voltage 250a triggers an internal pulse width modulation (PWM) counter of the slave component 160 to count in a first direction. In the embodiment illustrated in FIG. 2 the internal PWM counter is triggered to count up so that a PWM counter value 278 starts to increase following the detection of the falling edge of the voltage 250a. The falling edge of the voltage 250a may be obtained by bringing the field effect transistor 124, controlled by the master component 110, into a conducting state so that the capacitance 158 is relatively rapidly discharged via the field effect transistor 124 (see FIG. 1) so that the falling edge is relatively fast or steep. The time instant $T_1$ also marks the beginning of a first time interval t1 for the master component 110. For the slave component 160 the first time interval t1 begins slightly later due to the time that the voltage 250a requires to fall from LEVEL2 to the H/L threshold.

The voltage 250a continues to fall from the H/L threshold to a first level (LEVEL1), e.g. approximately 0V, where it remains until the end of the first time interval t1. The first time interval t1 ends at a second time instant $T_2$. A second time interval t2 begins at the second time instant $T_2$. In the embodiment and the situation of a transmission of a "0" from the master component to the slave component 160 illustrated in both cases in FIG. 2, the second time interval t2 is longer than the first time interval t1, i.e. t2>t1. For example, the second time interval t2 may be approximately double as long as the first time interval t1, i.e., t2=t1*2. As will be explained below in the context of the description of FIG. 3, the second time instant $T_2$ and thus also the relation between the first and second time intervals t1 and t2 depends on the data value to be transmitted from the master component 110 to the slave component 160. Beginning with the time instant $T_2$ the voltage 250a begins to increase, which is caused by bringing the field effect transistor 124 in a non-conductive state (see FIG. 1). As the capacitance between the electrical conductor and the ground potential is now charged via the pull-up resistor 156 which typically is relatively high-ohmic, the voltage 250a increases with a slower rate than during the falling edge at the first time instant $T_1$. When the voltage 250a exceeds the H/L threshold, the input amplifier 168 of the slave component 160 detects this as a rising edge which causes the internal PWM counter to start counting in the opposite direction, i.e. down. The voltage 250a continues to increase until it reaches LEVEL2 (e.g., the supply voltage Vdd) and remains at LEVEL2 for the remainder of the second time interval t2.

The end of the second time interval t2 is marked by a third time instant $T_3$ at which the master component 110 causes the field effect transistor 124 to be in a conducting state again so that the voltage 250a begins to decrease again, thus creating a further falling edge. When the voltage 250a falls below the H/L threshold, the internal PWM counter of the slave component 160 is controlled to count up again, i.e. to count in the first direction. The falling edge detected by the slave component 160 shortly after the time instant $T_3$ marks the end of the second time interval t2. The final counter value of the PWM counter depends on a relation between the first time interval and the second time interval, i.e., whether the first time interval is longer than the second time interval, or vice versa. Under the assumption that an initial counter value at the time instant $T_1$ was at an initial value (e.g., zero) and that the internal PWM counter of the slave component 160 counts in the first direction and the second direction at the same rate, the final counter value at the time instant $T_3$ indicates whether the first time interval t1 was longer than the second time interval t2, or vice versa. In FIG. 2 the second time interval t2 is longer than the first time interval t1 so that the final counter value at the time instant $T_3$ is below the initial value, i.e., final counter value<initial counter value. This relation between the final counter value and the initial counter value at the time instant $T_3$ is interpreted by the slave component 160 as a logical "0" that was received.

The falling edge of the voltage 250a at the time instant $T_1$ indicates the start of a pulse width modulation waveform and the falling edge at the further time instant $T_3$ indicates the end of the pulse width modulation waveform. With the pulse width modulation waveform being completed, the data transmission of one data bit from the master component 110 to the slave component 160 is completed, as well. The slave component 160 is capable of decoding the pulse width modulated voltage 250a regardless of the absolute duration of the first time interval and/or the second time interval. Rather, a relation between the first time interval and the second time interval t2 is evaluated once the second time interval is finished. The relation between the first time interval t1 and the second time interval t2 may be, for example, an information indicating whether the first time interval t1 is longer than the second time interval t2. In this manner, the pulse width modulation waveform between the time instants $T_1$ and $T_3$ may have a relatively arbitrary duration (within certain bounds, of course, for example due to rise/fall times of the voltage 250a, or a counter resolution and counter overflow of the internal PWM counter). Likewise, the data transmission is not dependent on the duration of the first time interval t1 and/or the second time interval t2 to be within a certain absolute range.

In case of a unidirectional communication or data transmission from the master component 110 to the slave component 160, the pulse width modulation waveform of the voltage 250a is complete with the execution of the falling edge subsequent to the time instant $T_3$. After a further rising edge to bring the voltage 250a back to LEVEL2 and a reset of the counter to the initial counter value, the transmission of the next bit could, in principle, be started with a new falling edge. However, FIG. 2 illustrates a bidirectional transmission in which one bit is transmitted from the master component 110 to the slave component 160 and subsequently one data bit is transmitted from the slave component 160 to the master component 110. The transmission of the data bit from the slave component 160 to the master component 110 starts with the time instant $T_3$, i.e. subsequent to the second time interval. At the time instant $T_3$, or more precisely when the slave component 160 detects the falling edge, a gate signal of the output driver 164 of the slave component 160 is controlled via the OR-gate 163 in dependence on the data bit to be transmitted to the master component 110 (as provided by the signal SICI out). In case 1 depicted in FIG. 2, the data bit to be transmitted to the master component 110 has the data value "1". Accordingly, the serial inspection/configuration interface output driver (SICI-OD) 164 is enabled so that the voltage 250a remains at LEVEL1 (e.g., 0V) even after the output driver 124 releases the electrical conductor of the connection 150. The output driver 164 of the slave component 160 is kept enabled (i.e., in a conducting state in the case of a setup similar to the one shown in the circuit diagram of FIG. 1) until the end of a third time interval t3. The master needs to read the data bit on the connection 150 before or when the third time interval t3 expires. The time span during which the voltage 250a on the electrical conductor of the connection 150 is controlled by the output driver 164 of the slave component 160 is indicated by a thick line segment in FIG. 2. The duration of the third time interval t3 may be a predetermined absolute value or it may be determined based on the durations of the first time interval t1 and/or the second time interval t2. For example, the duration of the third time interval t3 may be the absolute value related to the difference of the durations of the first and second time intervals t1 and t2, in particular the absolute value of the difference of the duration, i.e. t3=abs/t1−t2). Generally, the duration of the third time interval may be some function of the difference of the first and second time interval durations, i.e., $t_3=f(t_1-t_2)$. A method for receiving a data transmission may therefore comprise the steps of setting a duration of the third time interval subsequent to the second time interval based on the durations of the first and second time intervals and transmitting a response signal during the third time interval. In particular, the duration of the third time interval may be determined as an absolute value of a difference of the durations of the first and second time intervals.

A second case of the bidirectional data transmission between the master component 110 and the slave component 160 is illustrated in FIG. 2 by the voltage waveform 250b. During the first time interval t1 and the second time interval t2 the voltage waveform 250b is substantially identical to the voltage waveform 250a of case 1 so that once more a "0" is transmitted from the master component 110 to the slave component 160. In the second part of the bidirectional data transmission during which the slave component 160 transmits a data bit to the master component 110, a logical "0" is transmitted instead of a logical "1" as was the case with the voltage waveform 250a in the first case. Accordingly, the output driver 164 of the slave component 160 stays disabled (non-conducting) following detection of the falling edge in the third time interval t3. This means that the voltage on the electrical conductor of the connection 150 is pulled up again to LEVEL2 by the action of the pull-up resistor 156 once the output driver 124 controlled by the master component 110 releases the electrical conductor of the connection 150 at the time instant $T_3$ (i.e., the output driver 124 is controlled to change to a non-conducting state).

The master component 110 or, more precisely, the input amplifier 118 may sample the voltage on the electrical conductor of the connection 150 when the third time interval t3 expires, i.e., approximately at the time instant $T_4$. This gives the voltage 250b enough time to be pulled up above the high/low threshold (H/L threshold). Note that the slope of the rising edge within the third time interval t3 is influenced by the value of the pull-up resistor 156 and by the capacitance of the electrical conductor 150 against the ground potential. A high-ohmic pull-up resistor 156 and/or a large capacitance between the electrical conductor 150 and ground increases the rise time of the rising edge. As a consequence, the third time interval t3 needs to be long enough so that the voltage at the electrical conductor 150 has enough time to exceed the H/L threshold before the master component 110 samples the voltage. Note that the master component 110 may estimate the rise time of the rising edge by measuring the time between the time instant $T_2$ and the time instant at which the voltage on the electrical conductor 150 exceeds the H/L threshold. This estimated rise time may then be used by the master component 110 during the third time interval t3 for timing the sampling instant of the voltage, or to determine the duration of the third time interval t3. The latter may be achieved by varying the time instant $T_3$ at which the falling edge occurs which is controlled by the master component 110 and signals the end of the second time interval t2 to the slave component 160. In the configuration illustrated in FIG. 2 the slave component 160 needs to know the duration of the third time interval t3 only in case 1, in which a logical "1" is to be sent from the slave component 160 to the master component 110 so that the slave component 160 keeps the output driver 164 in a conducting state until the end of the third time interval t3. In case 2, i.e. the transmission of a logical "0" from the slave component 160 to the master component 110, the output driver 164 of the slave component 160 stays disabled anyway.

In the context of the method for receiving the data transmission, the measurement of the first time interval may comprise counting time units and the measurement of the duration of the second time interval may also comprise counting time units. Determining the relation between the durations of the first and second time intervals may comprise determining whether a first time unit count is larger than a second time unit count, the first time unit count corresponding to a number of time units within the first time interval and the second time unit count corresponding to a number of time units within the second time interval. During the first time interval the time units may be counted in a first direction up to the first time unit count. During the second time interval the time units may be counted, starting from the first time unit count, in a second direction opposite to the first direction. A determination may then be performed whether at the end of the second time interval the second time unit count is higher or lower than an initial time unit count at a start of the first time interval in order to determine the relation of the durations of the first and second time intervals.

The third time interval t3 is succeeded by a fourth time interval t4 which is an arbitrary "pause" between (bidirectional) bit transmissions.

During the third time interval t3 the counter of the slave component 160 counts in the direction of the initial counter value (e.g., 0). Since the data value transmitted from the master component 110 to the slave component 160 was a logical "0", the counter value that has been reached at the time instant $T_3$ was lower than the initial value. Accordingly, the counter counts up during the third time interval t3. Due to the relation between the durations of the first, second, and third time intervals t3=abs(t1−t2), the end of the third time interval t3 coincides with the counter reaching the initial value again. At the end of the third time interval, i.e. at the time instant $T_4$, the counter is stopped and remains at the initial value until a new falling edge is detected by the slave component 160.

Figure 3:
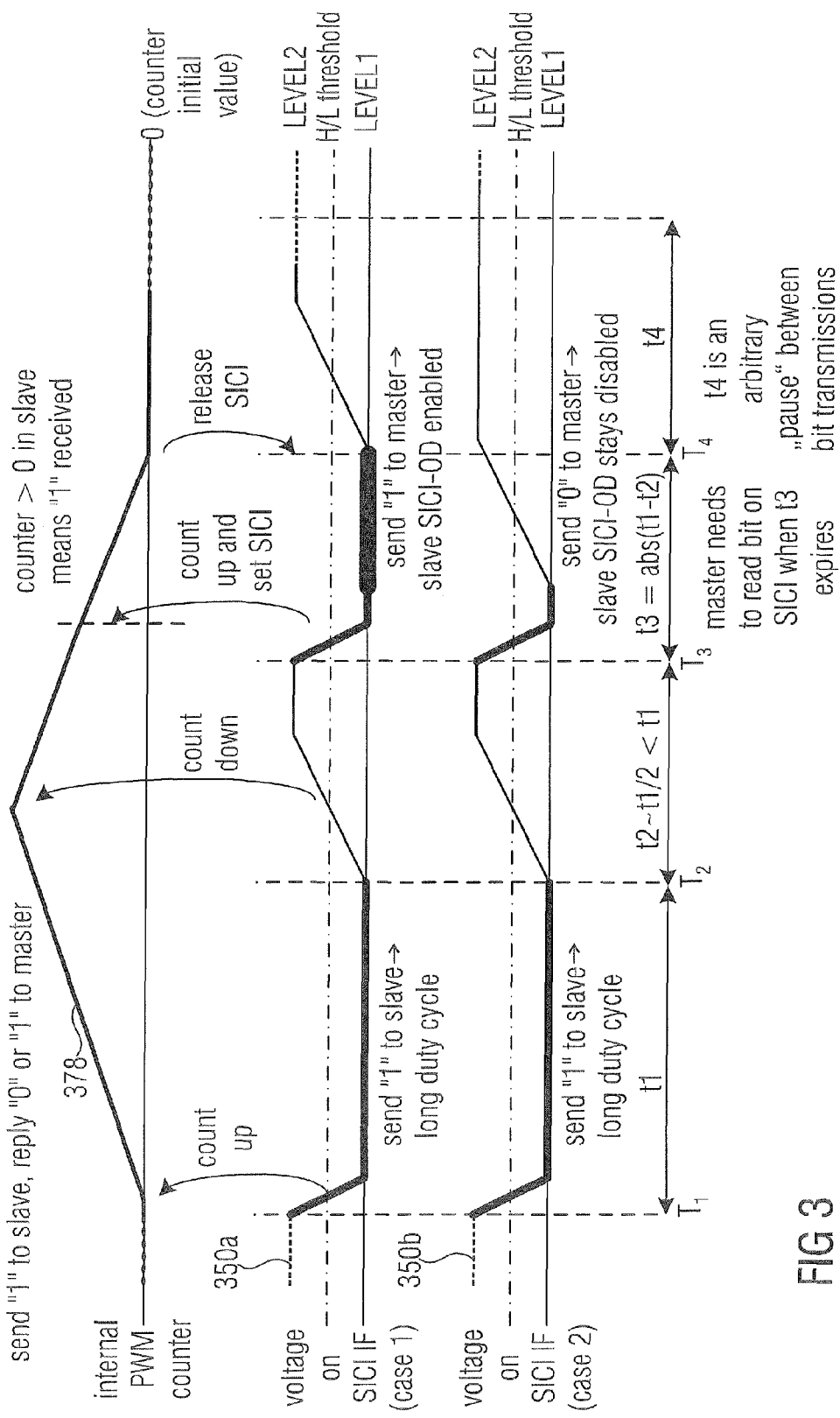
FIG. 3 is similar to FIG. 2 and illustrates another case of the transmission of a single bit and the reply of a single bit.

FIG. 3 illustrates the transmission and reply of a single bit in a schematic manner similar to FIG. 2. A difference between the FIGS. 2 and 3 is that in FIG. 3 a logical "1" is transmitted from the master component 110 to the slave component 160, whereas in the context of FIG. 2 a logical "0" was transmitted. The beginning of a transmission cycle is indicated by a falling edge of the voltages 350a (case 1) and 350b (case 2) on the electrical conductor of the connection 150. The falling edge is caused by the output driver 124 which is controlled by the master component 110 or is a part of thereof. As in the case illustrated in FIG. 2 the slave component 110 detects when the voltage on the electrical conductor 150 falls below the H/L threshold and controls its internal PWM counter to count up from the initial value as a result of the detection of the falling edge. The current counter value 378 of the internal PWM counter is also indicated in FIG. 3. The output driver 124 is kept for a relatively long time in the conducting state and thereby maintains the voltage 350a, 350b at LEVEL1 during the first time interval t1. At the time instant $T_2$, which marks the end of the first time interval and the beginning of the second time interval t2 for the master component 110, the output driver 124 is controlled to release the electrical conductor 150 so that the voltage 350a, 350b may be pulled up by the pull-up resistor 156. Since a logical "0" is transmitted from the master component 110 to the slave component 160, the second time interval t2 is chosen to be shorter than the first time interval t1. Therefore, the counter value 378 is higher than the initial counter value when the slave component 160 detects the further falling edge subsequent to the time instant $T_3$. The slave component 160 is thus capable of distinguishing between a transmitted logical "0" (FIG. 2) and a logical "1" (FIG. 3). In the case of a logical "1" the durations of the first and second time intervals may relate to each other as follows, t2<t1, e.g. t2≈½*t1.

The internal PWM counter of the slave component 160 is controlled to count down in response to the detection of the falling edge within the third time interval t3 until the counter value reaches the initial counter value. When the counter value reaches the initial counter value, this indicates the end of the third time interval t3 so that the output driver 164 of the slave component 160 may be released at this time if a logical "1" was transmitted from the slave component 160 to the master component 110 during the third time interval t3 (case 1). Regardless of whether the slave has sent a logical "0" or a logical "1", both output drivers 124 and 164 will have released the electrical conductor of the connection 150 during the fourth time interval t4 following the time instant $T_4$.

The master component 110 may employ a "unit time" (a) or a multiple of the unit time in the context of the generation of the transmission protocol in order to generate the above mentioned time intervals t1, t2, t3 and t4. The master component 110 starts each single bit to be transmitted to the slave component 160 with a low pulse followed by a high time which is ended by a further low pulse. The ratio or relation of the times during which the voltage 250a, 250b and 350a, 350b was at a high level (LEVEL2, e.g., Vdd) or a low level (LEVEL1, e.g., 0V) defines a transmitted bit ("0" or "1").

The decoding takes place by the slave beginning to count from the initial value (e.g., 0) in a first direction upon a falling edge and changes the counting direction at the rising edge. The counter value at the second falling edge which may now be greater than or less than the initial value defines the transmitted bit. In other words, the bit value may simply be derived from the sign of the difference between the counter value and the initial counter value.

The absolute value of the counter value furthermore defines the response time of the slave component 160. At the beginning of the second falling edge (or at the detection of the second falling edge) the slave component 160 counts down to 0. During this time, the slave may now pull the electrical conductor of the connection 150 to the low level (LEVEL1), as well, or let it reset to the high level (LEVEL2) after the master component 110 has finished its pulse. Before the end of this time, which is defined by the difference between the low time and high time (i.e., the first time interval and the second time interval, in the configuration illustrated in FIGS. 2 and 3 and in similar configurations) and predetermined by the master component 110, the master component needs to retrieve the reply of the slave component 160 (for example by sampling the voltage on the electrical conductor of the connection 150).

Subsequently, the transmission of the next bit may be started.

Figure 4:
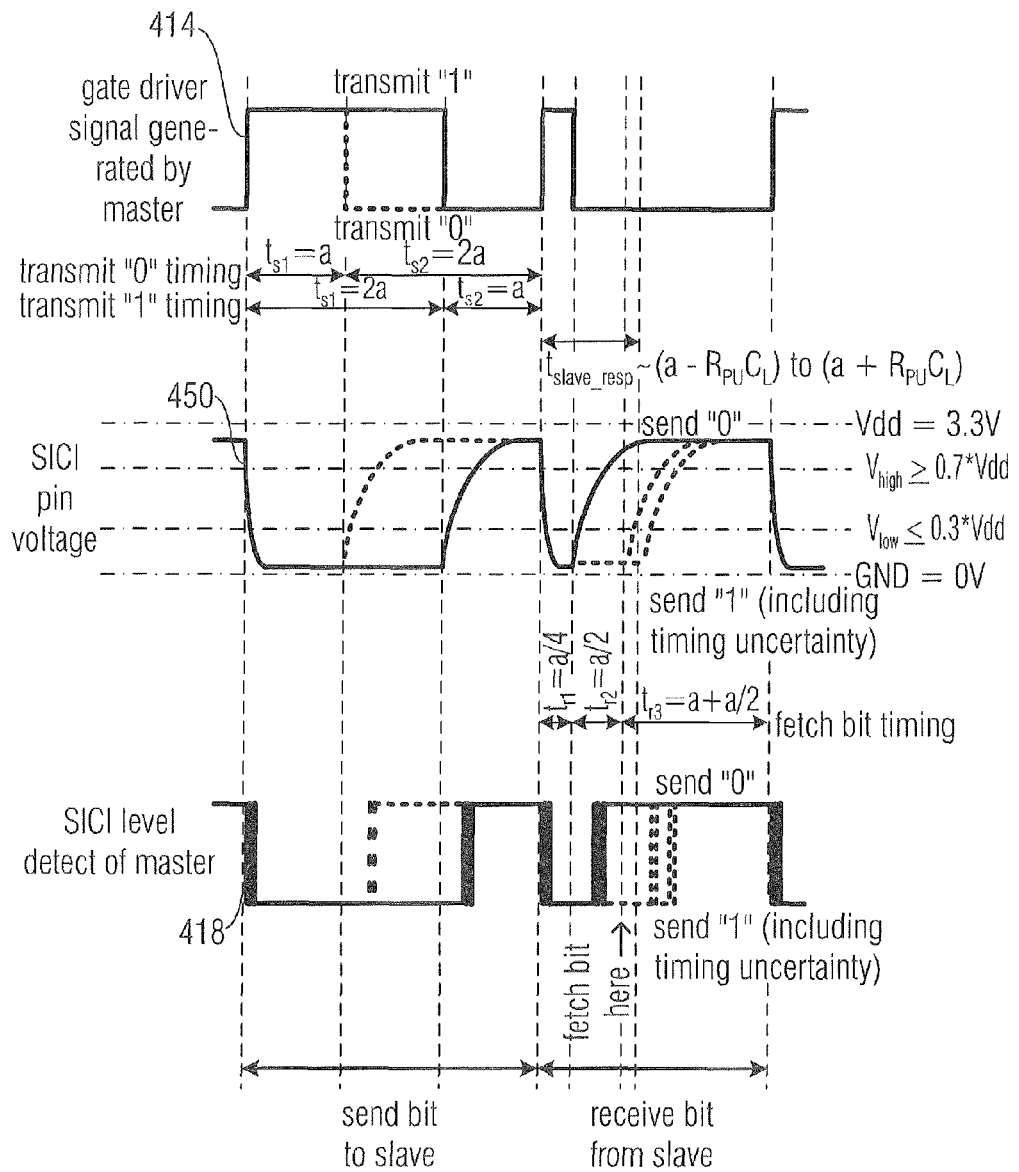
FIG. 4 shows some further waveforms of voltages and/or signals occurring during a transmission of a bit from the master component to the slave component and of a corresponding reply bit from the slave component.

FIG. 4 shows some further waveforms of voltages and/or signals occurring during a transmission of a bit from the master component 110 to the slave component 160 and of a corresponding reply bit from the slave component 160. In particular the transmission of a single bit to the slave component 160 and a corresponding reply bit from the slave component 160 is illustrated in FIG. 4 in relation to the unit time (a) and realistic electrical signal waveforms. FIG. 4 shows a gate driver signal 414 generated by the master component 110, an SICI pin voltage 450 which is substantially equal to the voltage on the electrical conductor of the connection 150, and an SICI level detect 418 of the master component 110. As can be seen at the gate driver signal 414, the first time interval t1 and the second time interval t2 are multiples of the unit time (a). In case of a transmission of a logical "0" from the master component 110 to the slave component 160, the duration of the first time interval t1 is equal to the unit time (a), i.e., $t_{s1}=a$. The first time interval ends with a falling edge of the gate driver signal 414 as indicated by the dashed part of the gate driver signal 414, the dashed part corresponding to the timing of a transmission of a logical "0" to the slave component 160. The second time interval t2 is twice as long as the first time interval t1 so that $t_{s2}=2a$. At the end of the second time interval the gate driver signal 414 has a rising edge again. In the configuration shown in FIG. 1 a high level of the gate driver signal 414 causes the output driver 124 to be in a conducting state so that the voltage on the electrical conductor 150 is pulled down close to the electrical ground potential, typically 0V, by definition. Accordingly, a high level of the gate driver signal 414 corresponds to a low level of the transmission signal, i.e., the SICI pin voltage 450, and vice versa. Furthermore, a rising edge of the gate driver signal 414 corresponds to a falling edge of the SICI pin voltage 450, and vice versa. However, this relation between the gate driver signal 414 and the SICI pin voltage 450 depends on the specific configuration of the transmission circuit so that other relations between the gate driver signal 414 and the SICI pin voltage 450 are imaginable, as well.

Regarding the SICI pin voltage 450, the dashed line shown in the first part of the waveform (i.e., during the first and second time intervals) corresponds to a transmission of a logical "0" to the slave component 160. The case of a transmission of a logical "1" is illustrated in FIG. 4 where the gate driver signal 414 and the SICI pin voltage 450 are drawn in full stroke. Where the gate driver signal 414 and the SICI pin voltage are drawn in full stroke only, the signals for the "0" transmission case and the "1" transmission case substantially coincide. In the case in which a logical "1" is transmitted to the slave component 160, the first time interval t1 has a duration $t_{s1}=2a$ and the second time interval t2 has a duration $t_{s2}=a$. Accordingly, the first time interval is approximately double as long as the second time interval in this case.

The timing of the rising edge of the SICI pin voltage 450 is determined by the values of the pull-up resistor $R_{PU}$ 156 and the capacity on the electrical conductor of the connection 150 with respect to the ground potential. In contrast, the (faster) falling edges are determined by open-drain drivers such as the output driver 124 controlled by the master component 110 and the output driver 164 of the slave component 160. Thus, the time constant a may be determined by the pull-up resistance and the load capacity on the bus, for example by $a \geq 3*R_{PU}*C_L$.

The transmission of a send bit to the slave component 160 takes place during the first and second time intervals. The second time interval is ended by a rising edge of the gate driver signal 414 and a corresponding falling edge of the SICI pin voltage 450. The rising edge of the gate driver signal 414 is followed by a falling edge shortly after, for example after a time interval having a duration $t_{r1}=a/4$. The third time interval having a duration $t_{slave\_resp}$ begins at the rising edge of the gate driver signal 414, too. The duration of the third time interval is approximately $t_{slave\_resp} \approx (a-R_{PU}C_L) \ldots (a+R_{PU}C_L)$. Again, two cases may be distinguished in connection with the third time interval, namely a transmission of a logical "one" from the slave component 160 to the master component 110 (illustrated by a dashed line of the SICI pin voltage 450) and the transmission of a logical "0" to the master component 110 (indicated by a full stroke line of the SICI pin voltage 450).

Subsequent to the falling edge of the gate driver signal 414 within the third time interval the SICI pin voltage 450 may be controlled by the slave component 160. In case the slave component 160 sends a logical "0", the SICI pin voltage 450 is released immediately after the falling edge of the gate driver signal 414 within the third time interval, because the output driver 164 of the slave component 160 remains disabled, i.e. in a non-conducting state, so that the pull-up resistor 156 may pull-up the SICI pin voltage 450 to approximately LEVEL2. FIG. 4 also illustrates an SICI level detect signal 418 which is, for example produced by the input amplifier or Schmitt trigger 118 of the master component 110. Again, the dashed line of the SICI level detect signal 418 corresponds to the transmission of a logical "0" to and from the slave component 160. The SICI level detect signal 418 indicates whether the SICI pin voltage 450 is above or below two thresholds $V_{high}$ and $V_{low}$. The upper threshold $V_{high}$ corresponds to approximately 0.7*Vdd. The lower threshold $V_{low}$ corresponds to approximately 0.3*Vdd. The SICI level detect signal 418 is at a (logical) low level if the SICI pin voltage 450 is smaller than the lower threshold $V_{low}$ and at a (logical) high level if the SICI pin voltage 450 is greater than the higher threshold $V_{high}$. In the range between the lower threshold $V_{low}$ and the higher threshold $V_{high}$ the value of the SICI level detect signal 418 depends on whether the SICI pin voltage exhibits a rising edge or a falling edge (hysteresis). If the SICI pin voltage 450 rises from a value smaller than $V_{high}$ to a value bigger than $V_{high}$, the SICI level detect signal 418 passes from a logical low level to a logical high level. If the SICI pin voltage 450 falls from a value bigger than $V_{low}$ to a value smaller than $V_{low}$, the SICI level detect signal 418 passes from a logical high level to a logical low value.

When receiving a data bit from the slave component 160, the master component 110 evaluates the value of the SICI level detect signal 418 (approximately) at the end of the third time interval. In case the slave component 160 sends a logical "1" the SICI pin voltage 450 typically has already reached LEVEL2 or at least exceeded the upper threshold $V_{high}$. In the contrary case, when the slave component 160 sends a logical "1", the SICI pin voltage 450 is substantially still at the ground potential GND=0V. Thus, the data value transmitted from the slave component 160 to the master component 110 may be determined by evaluating the SICI level detect signal 418 at the indicated time instant ("fetch bit here"). This is true even if a timing uncertainty exists regarding the rising edge in the SICI pin voltage 450. This rising edge of the SICI pin voltage 450 which is, in the case of a transmission of a logical "1" to the master component 110, generated by bringing the output driver 164 of the slave component 160 in the non-conducting state, occurs approximately $t_{r2}=a/2$ after the occurrence of the falling edge in the gate driver signal 414 during the third time interval. However, the rising edge in the SICI pin voltage 450 may begin at a later time, as well. The reason is that the slave component 160 determines the start and the duration of the third time interval based on the time instances when the SICI pin voltage 450 exceeds and/or falls below the two thresholds $V_{high}$ and $V_{low}$. This means that the slave response time $t_{slave\_resp}$ may vary within a certain range. With the above mentioned choice of $a \geq 3*R_{PU}*C_L$, the slave response time may vary as $2/3*a \leq t_{slave\_resp} \leq 4/3*a$, approximately. In general, the slave response time $t_{slave\_resp}$ may vary as $(a-R_{PU}C_L) \leq a \leq (a+R_{PU}C_L)$, approximately. In case the load capacity $C_L$ on the line and/or the value of the pull-up resistor $R_{PU}$ are unknown, the master component 110 may estimate the time constant $R_{PU}*C_L$ by evaluating the time between a falling edge of the gate driver signal 414 and thus a releasing of the voltage on the electrical conductor 150 and an exceeding of the SICI pin voltage 450 of the upper threshold $V_{high}$.

The pause between two bit transmissions may have a duration of, for example, $t_{r3}=a+a/2$. During this time the SICI pin voltage 450 may stabilize itself at LEVEL2 since both output drivers 124, 164 have released the SICI pin voltage 450.

Note that the signal edges of the SICI level detect signal 418 of the master component 110 may be somewhat "blurry" because of parasitic effects on the electrical conductor of the connection 150.

Figures 5, 6:
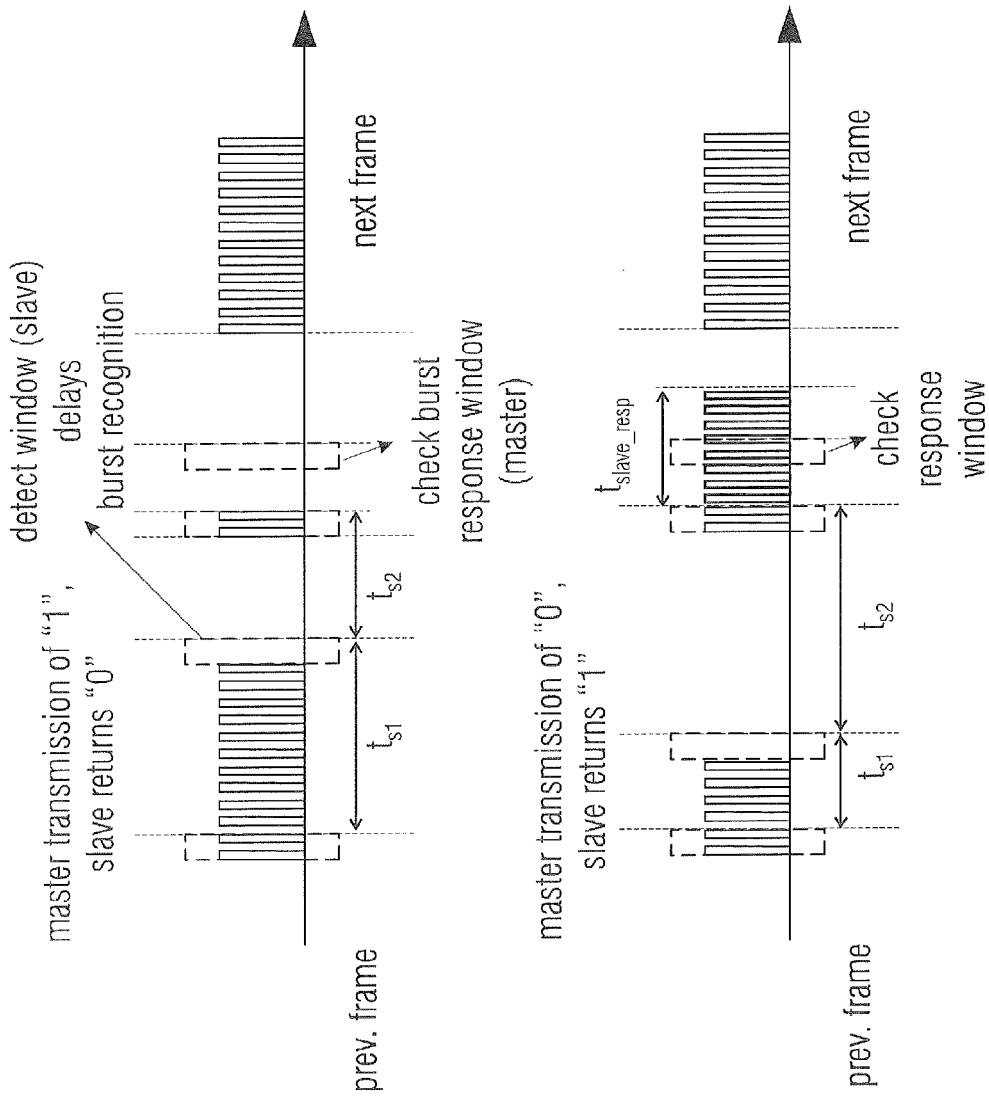
FIG. 5 illustrates a transmission signal using frequency bursts during a transmission of one bit from a master component, the decoding of the same by a slave component, and the response of one bit from the slave component to the master component.
FIG. 6 is similar to FIG. 5 and illustrates another case of the transmission of a single bit and the replay of a single bit.

FIG. 5 illustrates a transmission signal using frequency bursts during a transmission of one bit from a master component and the response of one bit from the slave component to the master component. Accordingly, a frequency burst is used as an alternative to voltage levels as illustrated in FIG. 2 or current levels. In FIG. 5 the master component transmits a "1" to the slave component and generates a frequency burst during the first time interval having a duration $t_{s1}$. The frequency burst may have be a sequence of square pulses at a specific frequency. The frequency burst thus corresponds to a particular signal value, for example the signal value "high" illustrated in FIG. 2. During the frequency burst the slave counts up its internal counter value. When the frequency burst ends, the slave detects this condition ("detect window (slave)") and counts down the internal counter value during the second time interval having a duration $t_{s2}$. Note that the detect window of the slave may delay the burst recognition due signal processing delay. The end of the second time interval is indicated to the slave component by a further frequency burst which is relatively short. It can be seen in FIG. 5 that $t_{s1} > t_{s2}$ which is interpreted by the slave component as a logical "1" which has been transmitted by the master component.

Subsequent to the reception of one bit from the master the slave component has the opportunity to return one bit to the master component. To this end the slave component either generates a frequency burst during the third time interval that follows the second time interval or remains silent. The frequency burst generated by the slave component may have the same frequency as the frequency burst generated by the master component, or it may have a different frequency. In FIG. 5 the case of the transmission of a logical "0" from the slave component to the master component is illustrated so that the slave component remains silent during the third time interval. The master component checks during a "check burst response window" whether the slave component has transmitted a frequency burst and deducts the data value of the response bit from the presence or absence of a frequency burst during the check burst response window. After a pause the next frame begins with the transmission of a frequency burst by the master component.

As an alternative to the master component remaining silent during the second time interval, the master component could generate a different frequency burst at a different frequency. The same is true for the slave component which could generate a frequency burst of a first frequency to indicate the transmission of a logical "0" and another frequency burst of a second frequency to indicate the transmission of a logical "1".

FIG. 6 is similar to FIG. 5 and illustrates another case of the transmission of a single bit and the replay of a single bit. The master component transmits a logical "0" to the slave component and accordingly the first time interval is shorter than the second time interval, i.e., $t_{s1} < t_{s2}$. During the third time interval the slave component generates a frequency burst which the master component may detect during the "check response window" and interpret the presence of the frequency burst as a logical "1" for the data value of the response bit.

The data communication method according to the teachings disclosed herein may provide or implement one or more of the following aspects.

A data transmission in duty cycle of a PWM signal, i.e., the information is in the duty cycle The entire PWM cycle is considered and evaluated Bitwise full-duplex bidirectional communication; currently 16 bit transmitted/received concurrently, arbitrary word widths are possible No need for analog components; the signal can be transmitted/received directly with a FPGA or microcontroller Data rate may vary from one bit to the next bit in an arbitrary manner Adaptability in case data rate is imposed by electrical conditions between maximal clock rates in the participants or the PWM timer widths Sender introduces timing for each individual transmission, each participant in the bus may be the "master"

Multi-master support by means of additional address header (e.g., as with ARP (Address Resolution Protocol) used with Ethernet and/or Collision Detection/Collision Avoidance methods (many methods possible)

Figure 7:
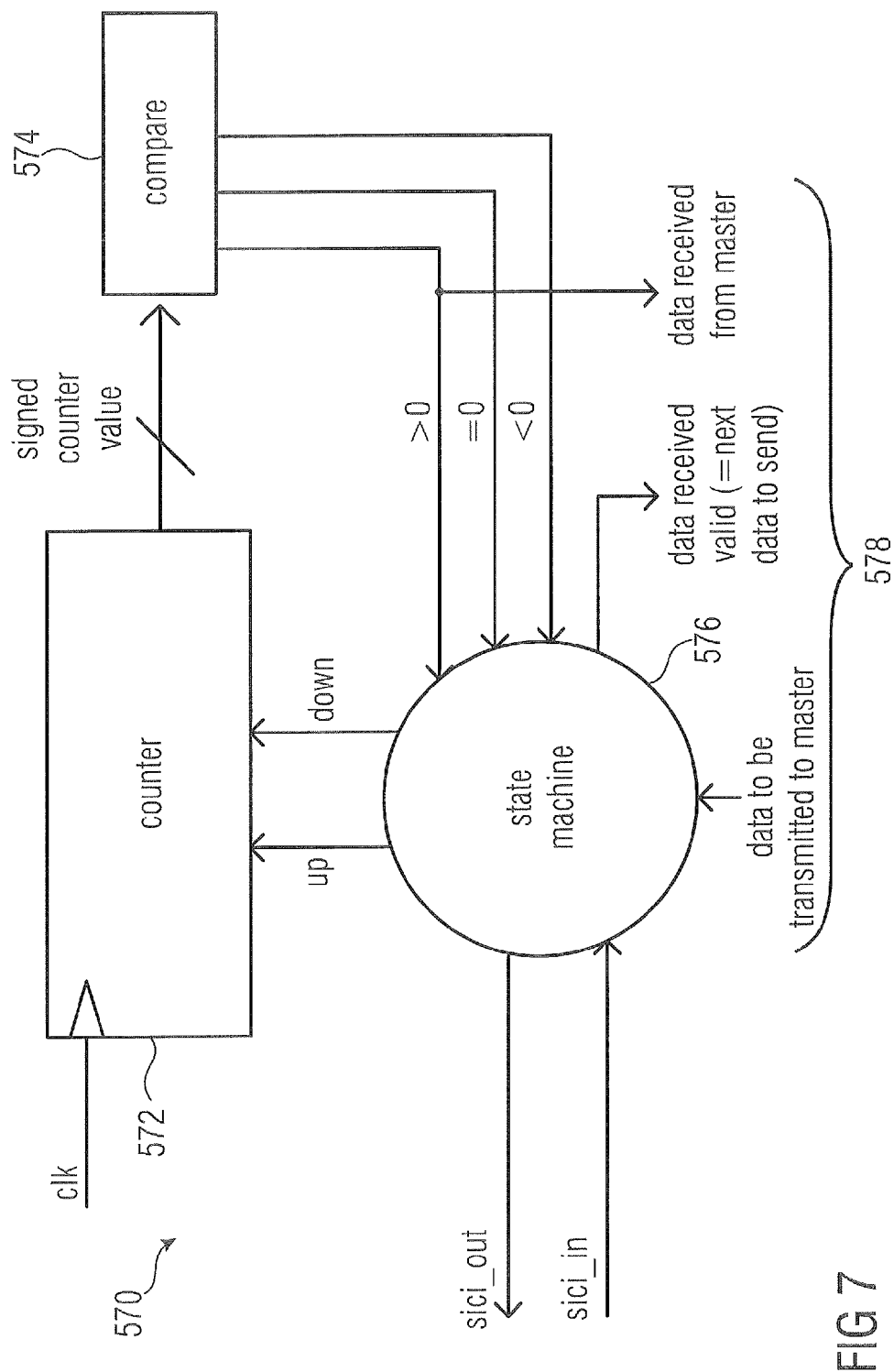
FIG. 7 shows a schematic block diagram of a circuit that may be a part of the slave component.

Each participant may use its own data rate when sending a packet; the other participants adhere to this data rate automatically when decoding FIG. 7 shows a schematic block diagram of a circuit that may be a part of the slave component 160 and serve to decode the data transmission from the master component 110. Furthermore, the circuit schematically shown in FIG. 7 may also serve to control a transmission of a data bit from the slave component 160 to the master component 110. The circuit 570 comprises a counter 572, a comparator 574, and a state machine 576. The state machine 576 is configured to receive a signal sici_in which is a digital representation of the SICI pin voltage 450. For example, the signal sici_in may be obtained by means of the input amplifier or Schmitt trigger 168. The state machine 576 may be configured to detect falling edges and rising edges within the signal sici_in. When the state machine 576 is in an idle state or wait state a falling edge in the signal sici_in causes the state machine 576 to enter a first time interval state (also see FIG. 8). At the same time, the state machine 576 may control the counter 572 to count up. When the state machine 576 then receives a rising edge, the state machine 576 enters a second time interval state and controls the counter 572 to count down, i.e. in the opposite direction. The detection of a further falling edge in the sici_in signal causes the state machine 576 to change the counting direction again and to output the signed counter value to the comparator 574. The comparator 574 is configured to compare the signed counter value with the initial counter value in order to determine whether the current counter value is greater than, equal to, or less than the initial counter value. The result of the comparison performed by the comparator 574 indicates the data value of the data bit transmitted from the master component 110 to the slave component 160. Furthermore, the result of the comparison is fed back to the state machine 576 which determines the counting direction of the counter 572 for the subsequent third time interval. In case the counter value at the end of the second time interval t2 is positive, the state machine 576 controls the counter 572 to count down until it reaches 0, i.e., the initial value. Likewise, the state machine 576 controls the counter 572 to count up if the comparison result is negative. In case a data bit is to be transmitted from the slave component 160 to the master component 110, the state machine 576 may provide a corresponding output signal sici_out. The signal sici_out may be used as a gate driver signal for the output driver 164 of the slave component 160. The signal sici_out is typically at a logical low level so that the output driver 164 is in a non-conducting state, unless the slave component 160 wants to transmit a logical "1" to the master component 110. In this case the state machine 576 controls the signal sici_out to be at a logical high level so that the output driver 164 becomes conducting during the third time interval and thus maintains the SICI pin voltage 450 at 0V or close to 0V (smaller than the lower threshold $V_{low}$, in any event).

The state machine may be configured to control the counter to count, at the end of the second time interval, in the second direction starting from the counter value that has been reached at the end of the second time interval to the initial value. The data communication device 570 may further comprise a transmission signal switching device (not shown) configured to switch a back transmission signal from a second signal value to a first signal value, the back transmission signal to be transmitted from the data communication device to the remote data communication device during the third time interval, the transmission signal switching device being further configured to set the signal value of the back transmission signal on the basis of a data value to be transmitted from the data communication device to the remote data communication device. A duration of the third time interval may be determined as an absolute value of the difference of the durations of the first and second time intervals.

Three further lines 578 are used to connect the state machine 576 to a protocol unit (not shown) supplying the state machine with new data and fetching the received data from the state machine. One of the lines 578 output from the state machine 576 indicates whether the received data is valid (=next data to send).

Figure 8:
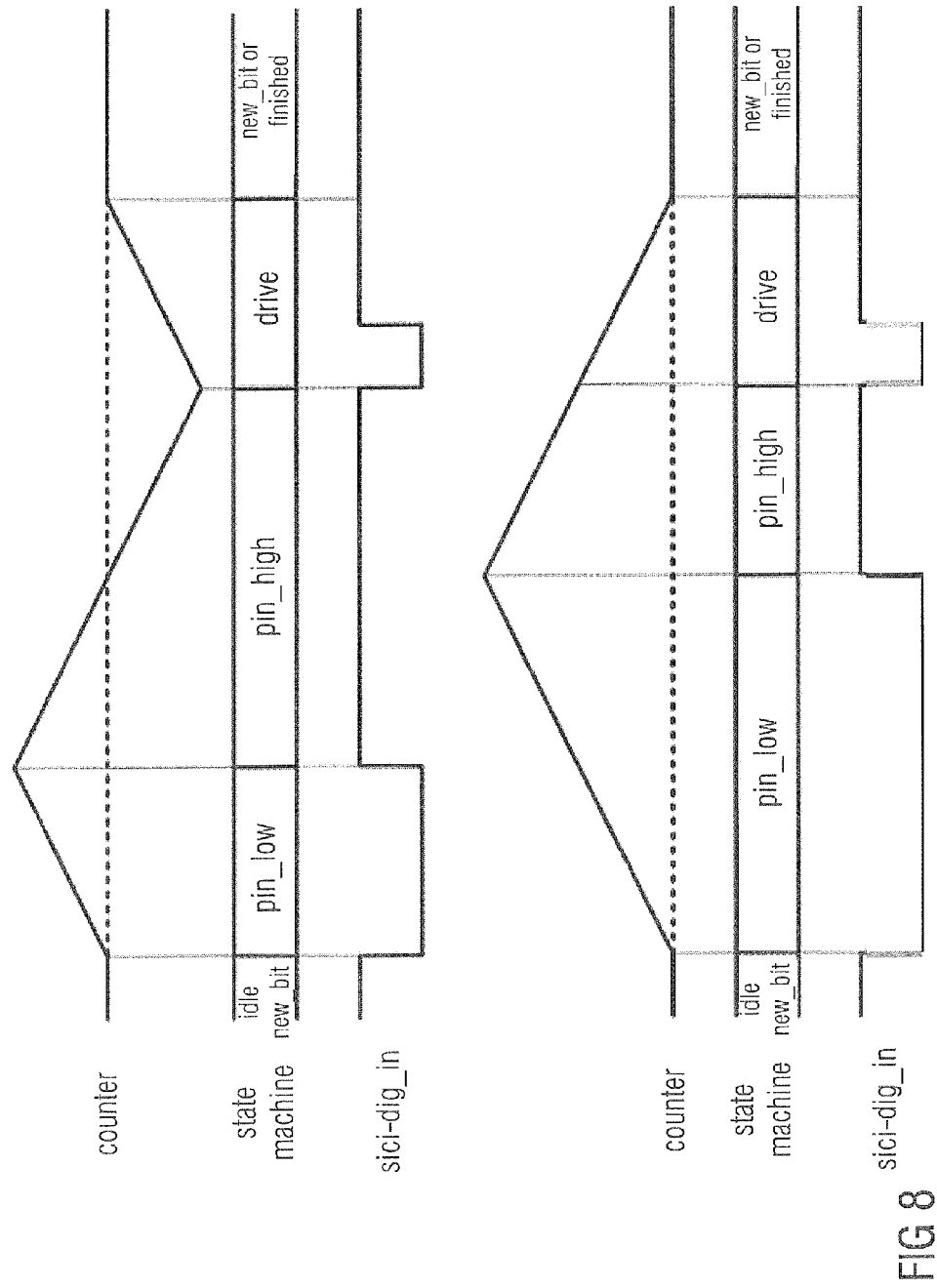
FIG. 8 shows two signal diagrams for signals received or generated by the slave component.

FIG. 8 shows two signal diagrams for signals received or generated by the slave component 160. The upper signal diagram illustrates the case of the reception of a logical "0" at the slave component 160 and the lower signal diagram illustrates the case of the reception of a logical "1" at the slave component 160.

The signal called "SICI_dig_in" is a binary representation of the SICI pin voltage 450 shown in FIG. 4. The digitalization of the SICI pin voltage 450 may have been performed by the input amplifier or Schmitt trigger 168 of the slave component 160 with respect to the two thresholds $V_{high}$ and $V_{low}$. The signal diagram also indicates a current state of the state machine 576 (FIG. 7). Furthermore, the signal diagram also shows the current counter value of the counter 572.

Initially, the state machine 576 is in an idle state and awaiting the reception of a new data bit from the master component 110. When a falling edge is detected in the signal SICI_dig_in, the state machine 576 changes its state to "pin_low". The duration during which the state machine is in the state "pin_low" coincides approximately with the first time interval. The falling edge of the signal SICI_dig_in also causes the counter 572 to count up until a rising edge occurs in the signal SICI_dig_in. At this time, the state machine 576 changes to a new state "pin_high" and the counter reverses its counting direction so that it counts down, beginning with the counter value that has been reached at the time of the rising edge in the signal SICI_dig_in. A further falling edge in the signal SICI_dig_in causes the state machine 576 to change to a state "drive" which means that the slave component 160 may now take control of the electrical conductor of the connection 150 (e.g., a communication bus) in order to send a data bit to the master component 110. The further falling edge also marks the end of the second time interval and by comparing the durations of the first time interval and the second time interval the data value of the bit transmitted from the master component 110 may be determined. To this end, the counter value at the time of the further falling edge is evaluated. It can be seen that the counter value is negative in the upper signal diagram which means that a logical "0" was transmitted from the master component 110 to the slave component 160. In contrast, the counter value at the time of the further falling edge in the signal SICI_dig_in is positive in the lower signal diagram which means that the master component 160 has transmitted a logical "1".

While the state machine 576 is in the state "drive" a further rising edge occurs in the signal SICI_dig_in which serves to prepare the connection 150 for the next bit transmission. In particular, the voltage on the electrical conductor of the connection 150 is allowed to be pulled up by the pull-up resistor 156. The end of the state "drive" is indicated by the counter value reaching 0 again. The state machine 576 changes its state to "new_bit or finished". This state may be maintained for a predetermined time before the state machine goes into the state "idle new_bit" again and thus is ready for the transmission of a subsequent data bit from the master component 110.

The teachings disclosed herein provide a self-synchronizing duplex/bidirectional interface. In contrast to the SENT/SPC standard, that is employed in, for example, automotive applications, the teachings disclosed herein provide not only a unidirectional transmission of data over a single line such as a single electrical conductor (typically in addition to a ground connection), but also a more flexible choice of the timing, i.e., with the teachings disclosed herein it is not necessary to maintain fixed time units for high cycles and low cycles as was the case with the SENT/SPC standard, which may lead to problems in case clock variations occur.

The SPC extension of the SENT standard enables a synchronous, half-duplex communication. Nevertheless, the data transmission of the master to the slave is predetermined by the length of a trigger pulse and hence limited. Furthermore, the basic timing is predetermined in a fixed manner or timing variations may only occur within predefined, narrow limits. The teachings disclosed herein overcome at least some of these limitations.

The teachings disclosed herein also differ from the LIN (Local Interconnect Network) interface which is a bidirectional, half-duplex interface. With the LIN interface the master sends a frame in order to address different slaves that subsequently send their response. This so called header already contains the timing requirement with which the addressed slave has to answer. In other words, the slave is capable of adapting to the transmission rate or the speed of the master. Nevertheless, an "initial" speed or transmission rate has to be defined to this end and the transmission has to occur within predefined bounds around this speed. However, such a predetermination may be problematic because the speed or transmission rate may not be easy to adjust in case of communication problems (e.g. long conductors, parasitic elements, . . . ). In contrast, the teachings disclosed herein allow the transmission timing and/or the data transmission rate to be adjusted in dependence on the properties of the connection between the master component and the slave component. In at least some embodiments according to the teachings disclosed herein, the properties of the connection 150 may be estimated by the master component 110, the slave component 160, or both. This information may then be taken into account when transmitting data from the master component 110 to the slave component 160 and, possibly, also in the other direction.

Other solutions employing a minimum of electrical connections as they are, for example, used in micro controllers, are typically based on test standards, such as JTag, that typically cannot be used in low complexity products (e.g. sensor products) without the corresponding chip architecture.

The above-mentioned solutions typically also tend to be complex and to have significant repercussions on the chip area, especially when they need to be integrated in "low complexity" products.

The solution according to the teachings disclosed herein offers a bidirectional data transmission over a single transmission line, wherein the timing is flexible and wherein after the transmission of a frame both sides (master and slave) may have sent data as well as received data.

Furthermore, the generation of the command (as contained in one transmission frame of the transmission signal) of the master component 110, as well as the decoding of the command within the slave component 160, is relatively simple and may be implemented using only little chip area.

The master component 110 and the slave component 160 are connected to the pull-up resistor 156 and may send data by pulling the electrical potential on the line too "low" of the ground potential. The data transmission from the master component 110 takes place using pulse width modulation (PWM), the pulse width modulation already defining or setting the timing for the data transmission from the slave component 160 back to the master component 110. As described above, the transmission protocol may be generated within the master components 110 using simple unit times (or multiples thereof). The transmission protocol may be decoded within the slave component 160 using a counter and a few logical circuits with relatively low hardware effort.

Figure 9:
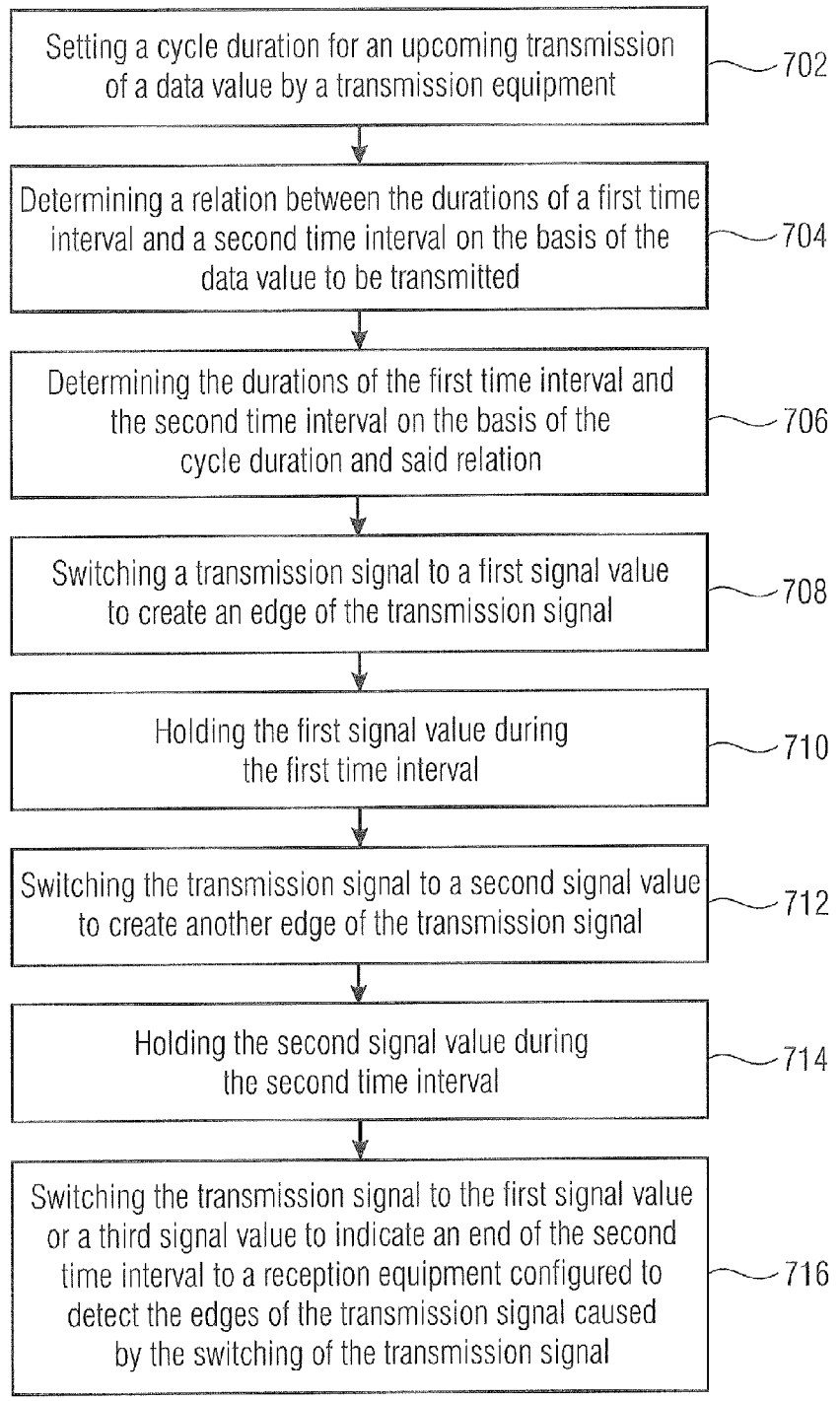
FIG. 9 shows a schematic flow diagram of a method of data transmission according to the teachings disclosed herein.

FIG. 9 shows a schematic flow diagram of a method of data transmission according to the teachings disclosed herein. Although the method of data transmission is illustrated in FIG. 9 as a sequence of individual steps, the order of the steps is not necessarily fixed in this manner. Rather, at least some of the method steps may be performed in an alternative order.

At a step 702 a cycle duration for an upcoming transmission of a data value by a transmission equipment (for example, a master component 110, as described above), is set. As explained above, the timing of the data transmission is highly flexible so that for each upcoming transmission of a data value, i.e. each data bit, a new timing may be used, although this is not necessary for the data transmission to function correctly. Nevertheless, the data transmission becomes less predictable by varying the timing relatively often so that an unauthorized tapping of the data transmission is hampered, at least as long as the device used for the unauthorized tapping is not aware of the varying timing and/or of the proper method for decoding the data transmission.

Another purpose for setting the cycle duration for an upcoming transmission may be an adjustment of the cycle duration to the properties of the connection between the master component 110 and the slave component 160. For example, an electrical connection may have a relatively high capacitance causing relatively long rise times and/or fall times of the signal edges within the transmission signal. According to the teachings disclosed herein, the cycle duration may be modified to match the properties of the connection 150 "inherently", i.e. without requiring a concerted reconfiguration of the master component 110 and the slave component(s) 160.

In step 704 the data value to be transmitted (e.g. a logical "0" or a logical "1") is used to determine a relation between the durations of a first time interval and a second time interval to be used during the subsequent data transmission. As indicated at 706, the durations of the first time interval and the second time interval are based on the cycle duration and the relation.

At step 708, the transmission signal is switched to a first signal value to create an edge of the transmission signal. The edge of the transmission signal may be a rising edge or a falling edge, a leading edge, or a trailing edge. This edge, which brings the transmission signal to the first signal value, indicates the start of the first time interval to the slave component, i.e., the receiver of the data transmission. The first signal value is held during the first time interval, as indicated at 710. The duration of the first time interval has been determined by the method step 706. The duration of the first time interval may be timed using a counter, a timer, or a clock, or a combination of these.

After the expiration of the first time interval, the transmission signal is switched to a second signal value to create another edge of the transmission signal. The other edge which brings the transmission signal to the second transmission value indicates the end of the first time interval and also the start of the second time interval. During the second time interval the transmission signal is held at the second signal value.

At the end of the second time interval the transmission signal is switched back to the first signal value to indicate an end of the second time interval to a reception equipment (for example, a slave component 160 as described above), as indicated by the method step 716. In the alternative, the transmission signal may be switched to a third signal value different from the first signal value and the second signal value. The reception equipment typically is the slave component(s) 160 and is configured to detect the edges of the transmission signal caused by the switching of the transmission signal.

In contrast to existing pulse width modulation schemes for data transmission, the first and second time intervals do not have to have predefined durations, but their durations are determined based on a relation between the first and second time intervals and a total cycle duration (for example, the sum of the durations of the first and second time intervals) which is a posteriori determinable. The relation between the durations of the first and second time intervals is, in turn, a function of the data value to be transmitted. This means that the data value to be transmitted is not encoded using a fixed duration such as, for example, the first time interval being 1 µs long in the case of a logical "0" and 2 µs long in the case of a logical "1", but rather whether the first time interval is longer or shorter than the second time interval.

The method of data transmission may further comprise one of more of the following method steps or features. A response signal may be received from the reception equipment during a third time interval subsequent to the second time interval. A duration of the third time interval may be determined as a function of the durations of the first and second time interval. In particular, the duration of the third time interval may be substantially equal to an absolute value of a difference of the durations of the first and second time intervals. The first time interval and the second time interval may form a pulse width modulation cycle, a duty cycle of the pulse width modulation cycle corresponding to a relation or a ratio of the durations of the first and second time intervals and being representative of the data value to be transmitted by the transmission equipment. A polling request may be transmitted from the transmission equipment to the (remote) reception equipment and a determination may be made whether the reception equipment sends a response to the polling request. A data request relative to requested data may be transmitted to the (remote) reception equipment in case the reception equipment has sent a positive response to the polling request. Subsequently, the requested data may be received from the reception equipment. The polling request may be transmitted to at least one further reception equipment (that is, not only one reception equipment but a plurality of reception equipments), wherein the data request to the reception equipment comprises an identification of the reception equipment.

Figure 10:
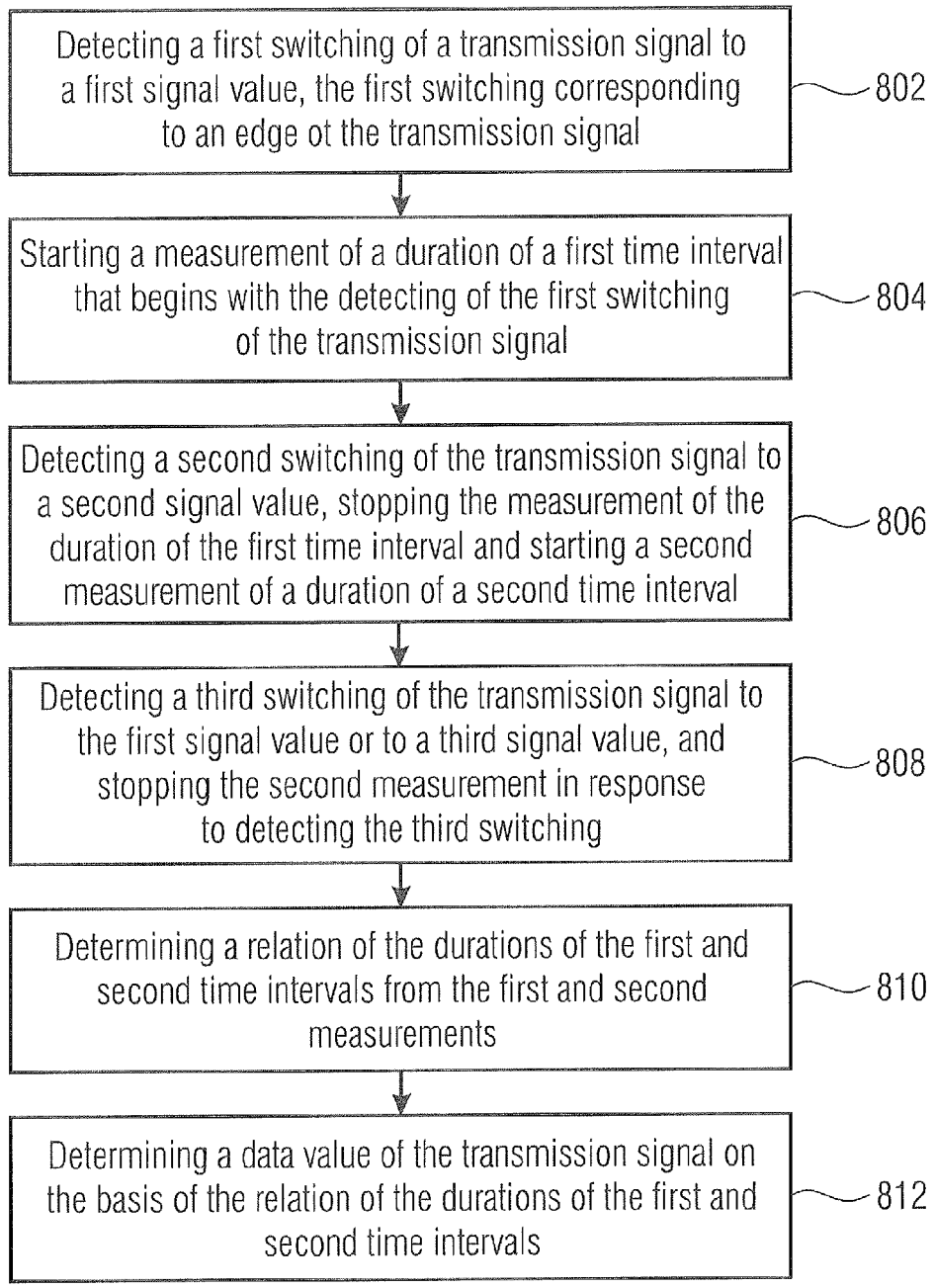
FIG. 10 shows a schematic flow diagram of a method of receiving a data transmission according to the teachings disclosed herein.

FIG. 10 shows a schematic flow diagram of a method of receiving a data transmission according to the teachings disclosed herein. The order of at least some of the method steps could be different from what is shown in FIG. 10.

At method step 802 a first switching of a transmission signal to a first signal value is detected. The first switching corresponds to an edge (rising, falling, leading, trailing, etc.) of the transmission signal. At step 804, a measurement of a duration of a first time interval is started. The first time interval begins with the detecting of the first switching of the transmission signal.

Upon detecting a second switching of the transmission signal to a second signal value, as indicated at method step 806, the measurement of the duration of the first time interval is stopped. In addition, a second measurement of a duration of a second time interval is started. Stopping the measurement of a duration of the first time interval and starting the second measurement of the duration of the second time interval may coincide, for example, in a configuration where a method of receiving a data transmission counts a counter value in a first direction, e.g., in an up-direction, during a first time interval and in a second direction, e.g. in a down-direction during the second time interval.

At 808 a third switching of the transmission signal to the first signal value or a third signal value is detected. This triggers the stopping of the second measurement in response to detecting the third switching. Note that the enumeration of the switching events as "first switching", "second switching", and "third switching" typically relates to all mentioned switching events of the transmission signal, regardless of whether the switching event brings the transmission signal to the first signal value or the second signal value or possibly the third signal value. In other words, a "switching" of the transmission signal typically corresponds to an edge, regardless of whether it is a rising edge or a falling edge.

At step 810 a relation of the durations of the first and second time intervals is determined from the first and second measurements. For example, the relation may simply indicate whether the first time interval was longer than the second time interval, or the other way around. At 812 a data value of the transmission signal is determined based on the relation of the durations of the first and second time intervals.

Figure 11:
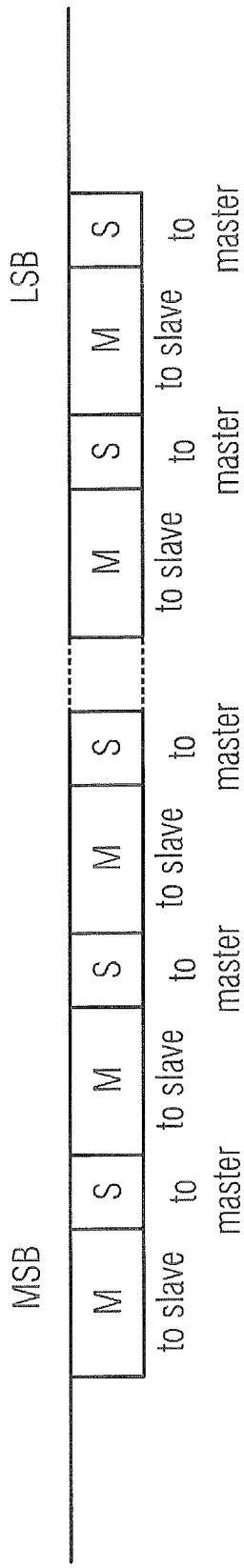
FIG. 11 illustrates a timing diagram of a data transmission of one full word.

FIG. 11 illustrates a time diagram of a data transmission of one full word (one word comprising n bits, e.g. 8 bits, 16 bits, or 32 bits) via a serial inspection/configuration interface (SICI) line. More precisely, one word is transmitted from the master component 110 to the slave component 160 and another word is transmitted from the slave component 160 to the master component 110. The bits of the two data words are interleaved so that a data bit transmitted from the master to the slave is followed by a bit transmitted from the slave to the master in an alternating manner. The transmission of the data words begins with the most significant bit (MSB) and ends with the least significant bit (LSB). In this manner, on a logic link level a full-duplex communication between the master and the slave is achieved. "Full-duplex" on a logic link level means that for each transmission of a data frame, one word with arbitrary bit length is sent and received concurrently (in a bit-interleaved manner). The term "transmission frame" used at various places herein designates the transmission of a pair of bits, one bit being transmitted from the master 110 to the slave 160 and the other bit being transmitted from the slave 160 to the master 110. Accordingly, one data frame comprises n transmission frames.

Although not illustrated in FIG. 11, a pause may be present between a transmission of a data bit from the slave to the master and a subsequent transmission of a data bit from the master to the slave. In particular, the master component 110 may initiate the transmission of a new bit to the slave and the reception of a bit from the slave typically in a relatively arbitrary manner, as long as a certain minimum pause is maintained which allows the voltage on the SICI line to settle to the default value, e.g. to LEVEL2 (e.g., VDD).

Figure 12:
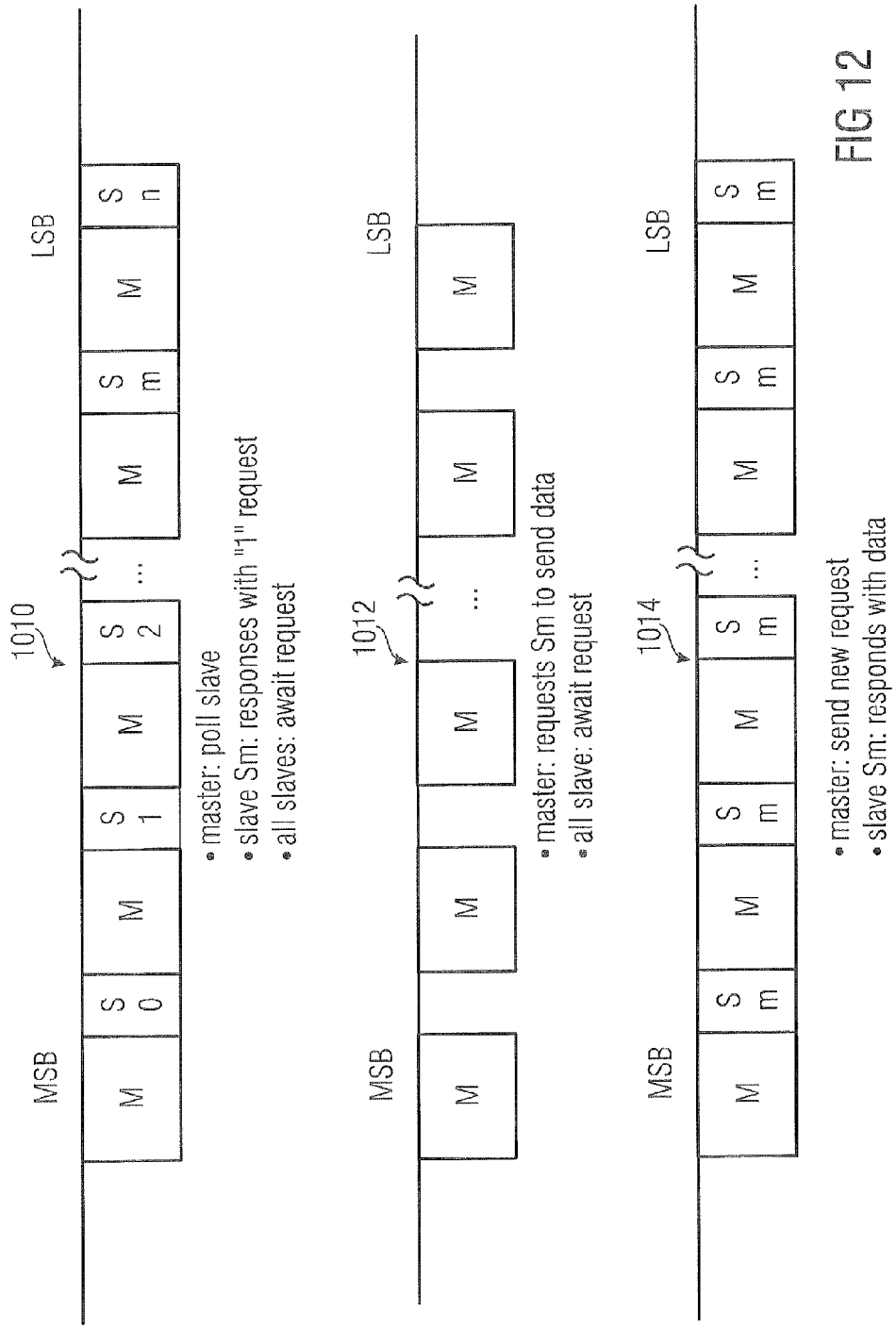
FIG. 12 illustrates a timing diagram of data transmissions between one master and several slaves.

FIG. 11 illustrates a complete data frame in a simplified manner. FIG. 12 illustrates a time diagram of data transmissions between one master and several slaves. Indeed, by implementing a header one master may address several slaves.

The master could, for example, send or broadcast a request and each slave wishing to make a data transfer to the master pulls back a low bit in a time slot assigned to the particular slave. FIG. 12 shows three data frames 1010, 1012, and 1014. During the first data frame 1010 the master polls the slaves. Each of the slaves is assigned one response bit starting from the most significant bit (MSB) down to the least significant bit (LSB). The exemplary slave Sm which has data to be transmitted to the master available, responds with a logical "1" during the third time interval of the m-th bit, i.e. the m-th transmission frame. The master detects that the SICI line 150 is pulled to ground potential and identifies the slave Sm as the originator, as the m-th bit is assigned to slave Sm. Other slaves may have responded with a logical "1", as well, during their respective time slots, thereby indicating to the master that they also wish to transmit data to the master. Subsequent to the first data frame 1010 all slaves await a slave-specific data request from the master.

During the second data frame 1012, the master requests the slave Sm to send the available data. To this end, the second data frame 1012 may comprise an identification of the slave Sm. The second data frame 1012 needs to be retransmitted completely before the slave Sm can determine that it is the intended recipient of the data request sent by the master. Therefore, no data transmission occurs from the slaves to the master during the second data frame 1012.

All slaves await their particular data request from the master before starting to transmit data to the master.

During the third data frame 1014, the master sends a request to the slave Sm which has been requested to send data during the previous data frame 1012. The slave Sm may now respond with the data to be transmitted during the third time intervals.

Note that the second data frame 1012 and the third data frame 1014 may be repeated for other slave S0 to Sm−1 and Sm+1 to Sn. Accordingly, the master may send data requests to individual slaves during a further second data frame 1012 and receive the data from the addressed slave during the corresponding third data frame 1014.

Prior to the first data frame 1010, the master may send or broadcast a polling request to the slave(s). The polling request may cause each slave to verify whether it has data available to be transmitted to the master. If so, the slave may prepare a data word containing all zeros except for one logical "1" at the position corresponding to an identification number of the slave, e.g. at the m-th position of the data word or data frame. During the subsequent data frame 1010 the slave may then transmit the data word and the logical "1" at the m-th position indicates to the master that the m-th slave Sm wishes to transmit data. Thus, the logical "1" is a positive response to the polling request of the master.

The second data frame 1012 contains the data request from the master for one particular slave. The slave receives the data request from the master after the positive response has been transmitted and ascertains whether the data request comprises an identification which matches a local equipment identification of the slave, i.e., its own identification. The available data is then transmitted to the master during one or more third time intervals of the third data frame 1014 subsequent to a completion of the data request 1012. In the example illustrated in FIG. 12 one data frame comprises n transmission frames.

From the perspective of a slave component, the actions illustrated in FIG. 12 comprise the reception of a polling request from a remote transmission equipment. The slave component then determines whether data to be transmitted to the remote transmission equipment is available. The slave component transmits a positive response to the polling request to the remote transmission equipment during a third time interval subsequent to the second time interval if data to be transmitted is available. Otherwise the slave component remains silent. Subsequent to sending the positive response the remote transmission equipment may send a data request to the slave component. The slave component may then ascertain whether the data request comprises an identification matching a local equipment identification. If the data request comprises a matching local equipment identification the slave component may transmit the available data to the remote transmission equipment during one or more third time intervals of one or more transmission frames subsequent to a completion of the data request.

It is also possible to do a bus enumeration as done, for example, in CAN buses (Controller Area Network). A master sends an "enumerate command" to all participants. Then it sends a dummy command, where each participant returns an ID. The ID which has the most "zeros" in the ID wins the cycle. Each participant checks also the return value and notes to be enumerated as soon as the send ID corresponds to the received ID and stops communicating. So the master can send another dummy command, where again the ID with the most "zeros" wins, except that one which already was enumerated in the last cycle and so on. The enumeration process finalizes if no participant answers on the dummy command from the master. It is also possible to do bus enumerations like with Ethernet, where each participant has a unique ID and just needs routing similar to the ARP (Address Resolution Protocol) layer in this protocol.

Figure 13:
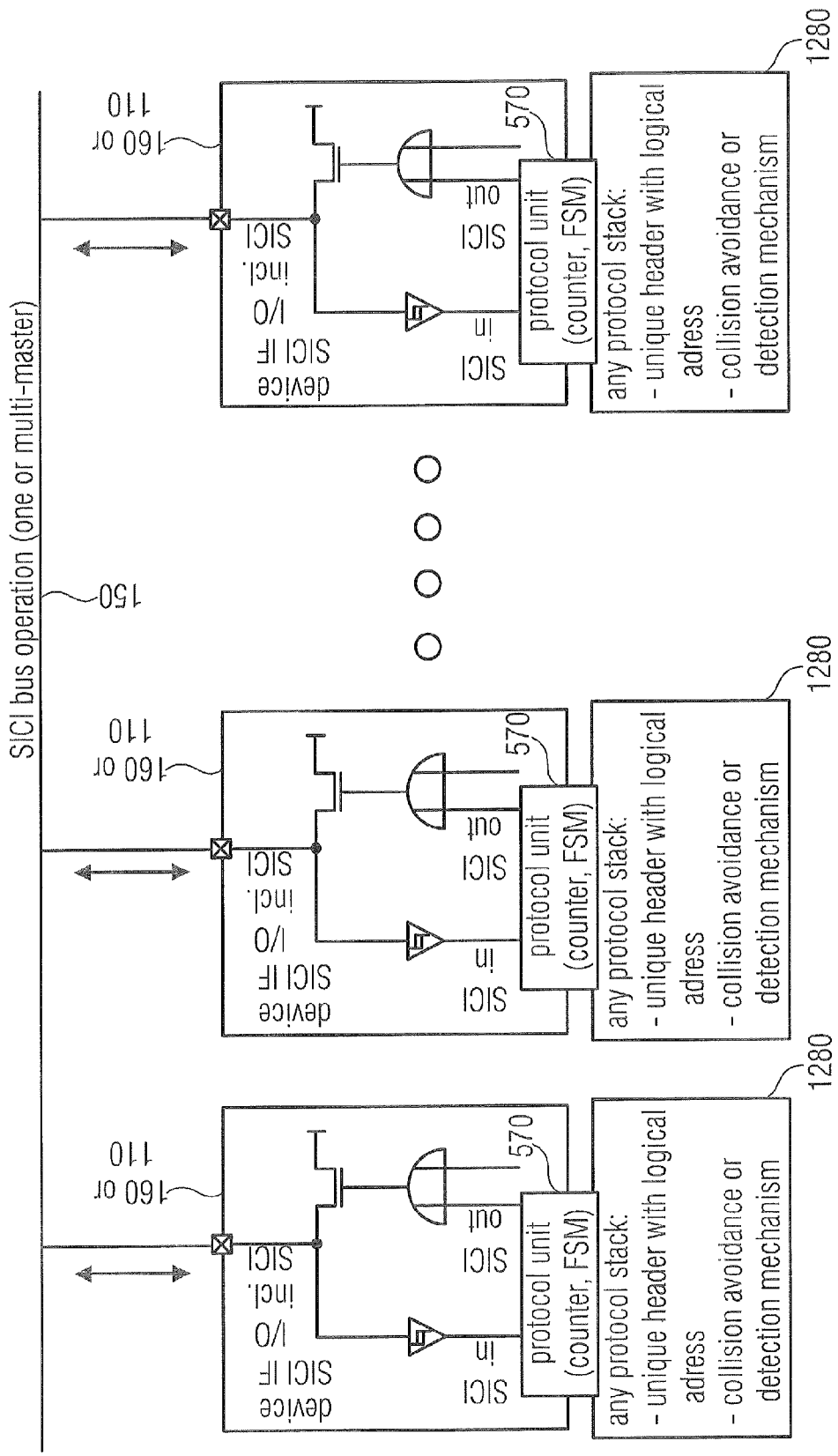
FIG. 13 illustrates, in a schematic manner, an interconnection of several devices via a connection.

FIG. 13 illustrates, in a schematic manner, an interconnection of several devices 110 or 160 via the connection 150. In this manner an SICI bus operation may be implemented. The devices 110 or 160 may be master components 110 or slave components 160. The SICI bus operation may be controlled by one master component 110 or, alternatively, using a multi-master control.

Each of the devices 110 or 160 comprises the input amplifier 168, the output driver 164 and the OR-gate 163. Furthermore, each device 110 or 160 comprises a protocol unit 570 that is connected to an output of the input amplifier 168 via an SICI-in line and to an input of the OR-gate 163 via an SICI-out line. The protocol unit 570 may comprise, for example, a counter and a finite state machine (FSM). One possible configuration of the protocol unit 570 is shown in the schematic block diagram of FIG. 7 and has been described in the corresponding description above.

The protocol unit 570 of each device 160 may communicate with a protocol stack 1280. While the protocol unit 570 is configured to handle basic communication tasks such as bit synchronization, bit decoding, and bit encoding, the protocol stack 1280 provides more complex communication functionality. In terms of the OSI (Open Systems Interconnection) layer model, the protocol unit 570 belongs (primarily) to the physical layer, while the protocol stack 1280 may be attributed to the data link layer. Nevertheless, some of the functions performed by the protocol unit 570 may belong to the data link layer and/or some of the functions provided by the protocol stack 1280 may belong to the physical layer or the network layer of the OSI layer model. The protocol stack 1280 may provide a unique header with a logical address for each device 160. The logical address of a particular device 160 may be used to ascertain whether a message transmitted via the connection 150 is destined for this particular device 160. In some embodiments of the teachings disclosed herein the unique header with the logical address may also be used to identify the originator of a message transmitted by the device 160 via the connection 150. The protocol stack 1280 may further provide a collision avoidance mechanism and/or a collision detection mechanism. In principle, a network component connected to the connection 150 may be configured to function either as a device 160 or a master component 110. In particular, the hardware within the network component 110 or 160 for interfacing with the connection 150 is identical or at least very similar in a slave component 160 and a master component 110. Thus, no (or only little) additional hardware is required when extending a slave component 160 to a master/slave component, or when extending a master component 110 to a master/slave component. A collision may occur if two network components attempt to take control of the SICI bus operation as a master component 110 in a concurrent manner. The protocol stack 1280 may detect this conflict, for example, because an expected acknowledgement from an intended communication partner is not received by the (temporary) master component 110 in due time.

Figure 14:
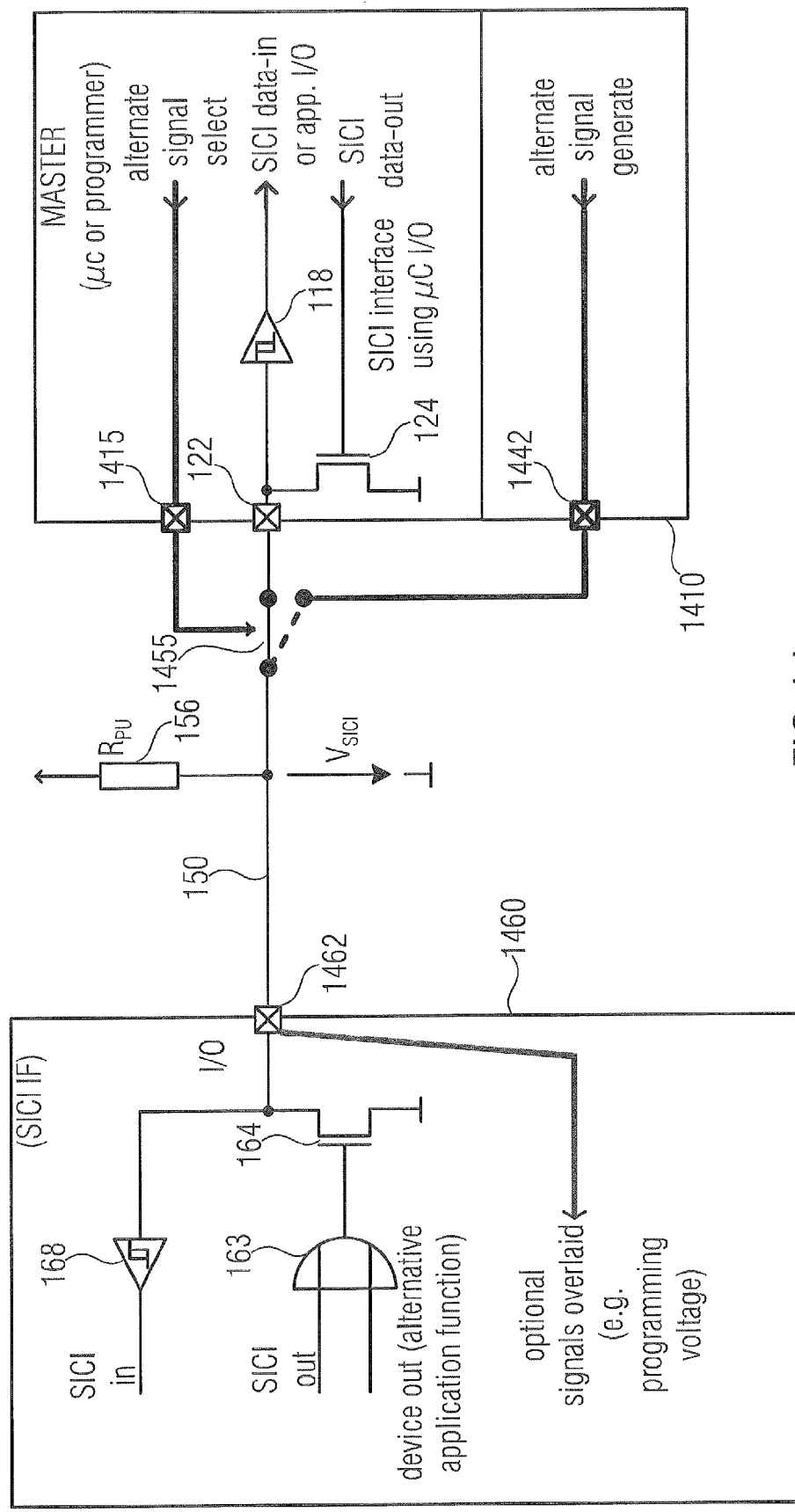
FIG. 14 shows a schematic circuit diagram of another configuration of the teachings disclosed herein enabling the transmission of an alternate signal from the master to the slave via the SICI line.

FIG. 14 shows a schematic circuit diagram of another configuration of the teachings disclosed herein enabling the transmission of an alternate signal from the master to the slave via the SICI line. The master component 1410 comprises an output 1442 for an alternate signal generated by a corresponding component. The master component 1410 further comprises an output for a selection signal to select the alternate signal for transmission via the connection 150. The selection signal is applied to a switch or multiplexer 1455 which connects the connection 150 either with the SICI output 122 or with the alternate signal output 1442. Regarding the slave component 1460, the connection 150 is connected to an input/output 1462 which is internally connected to the output driver 164 and the input amplifier 168, as described above, and also to one or more components (not shown, but hinted at by an arrow) which process optional overlaid signals (e.g., a programming voltage for an EEPROM).

Figure 15:
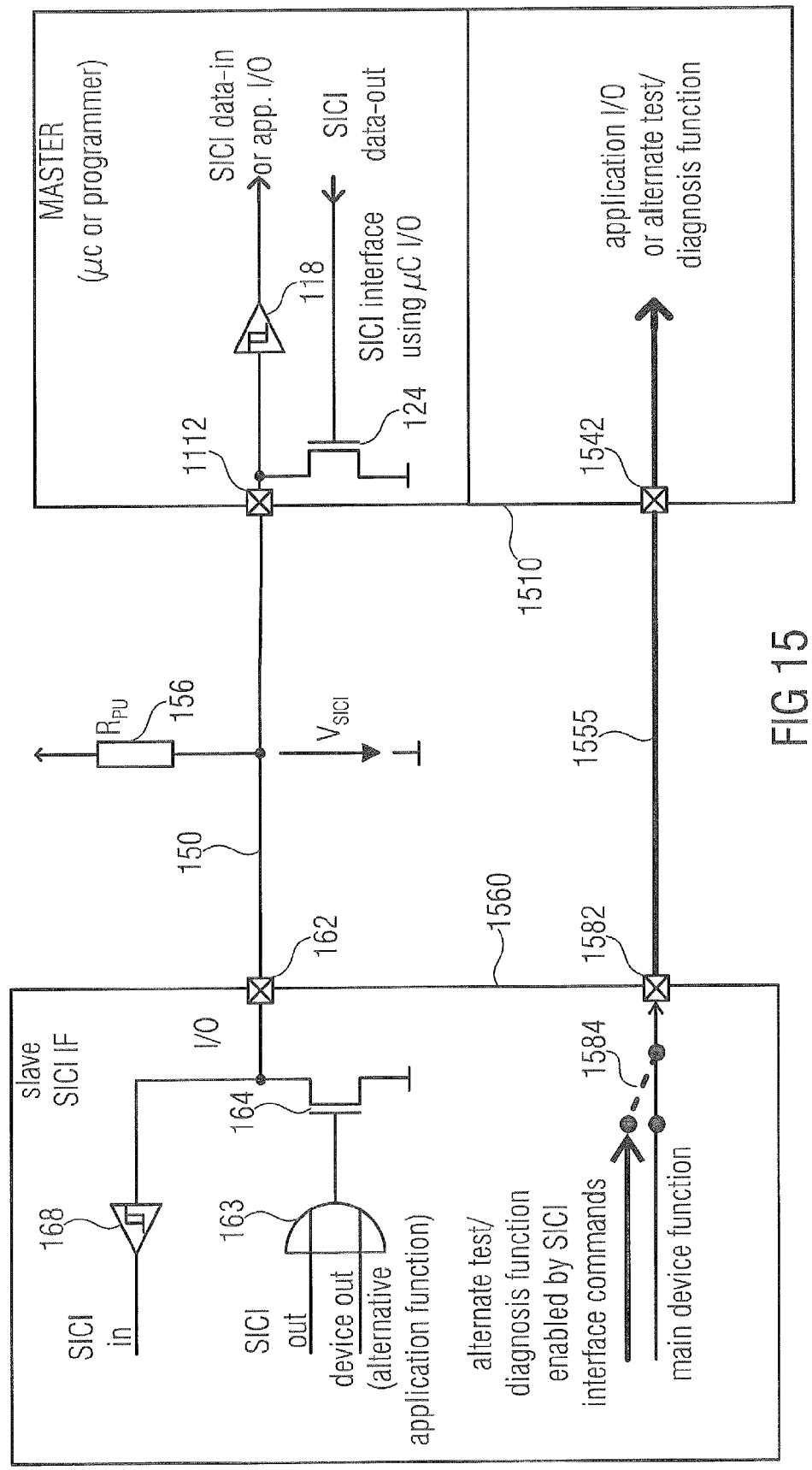
FIG. 15 shows a schematic circuit diagram of another configuration of the teachings disclosed herein employing an additional line between the master and the slave for application input/output or alternate test/diagnosis functions enabled by SICI interface commands.

FIG. 15 shows a schematic circuit diagram of another configuration of the teachings disclosed herein employing an additional line 1555 between the master and the slave for application input/output or alternate test/diagnosis functions enabled by SICI interface commands. The upper parts of the master component 1510 and the slave component 1560 are substantially identical to the master component 110 and the slave component 110 shown in FIG. 1. In addition, the master component 1510 comprises an input/output 1542 for application I/O or alternate test/diagnosis function. The input/output 1542 is connected to an input/output 1582 of the slave component 1560 via the additional line 1555. Within the slave component 1560 the input/output 1582 is connected to a switch 1584 which multiplexes or demultiplexes the signals transmitted via the additional line 1555. The switch 1584 may be connected to a component providing a main device function and also to one or more components that provide(s) an alternate test/diagnosis function which is enabled by SICI interface commands. Indeed, the data communication via the SICI connection 150 may be used to control the switch 1584 and to activate a test mode or a diagnosis mode of the slave component 1560 or of another component associated with the slave component.

Figure 16:
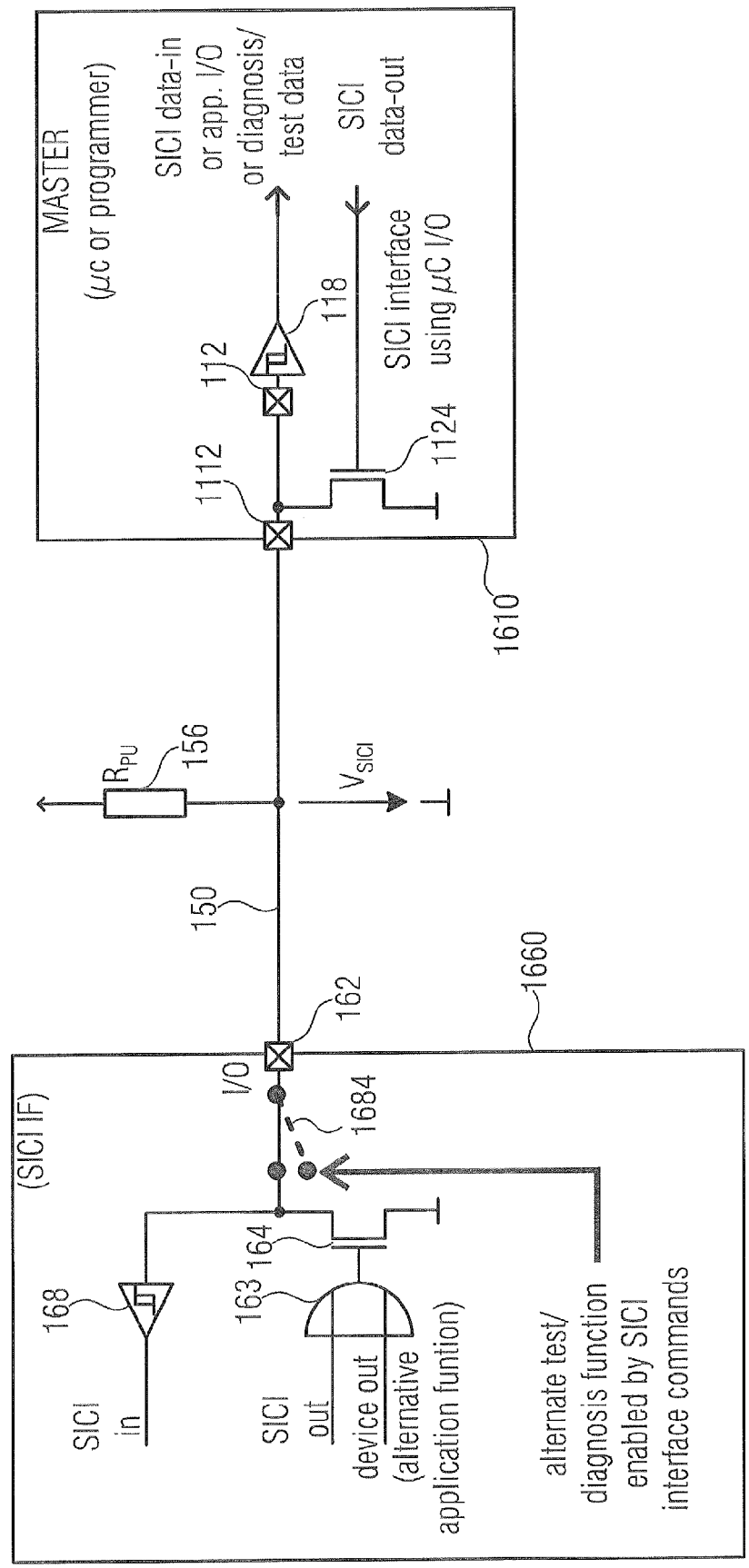
FIG. 16 shows a schematic circuit diagram of another configuration of the teachings disclosed herein enabling the use of the SICI line for an alternate test/diagnosis function enabled by SICI interface commands.

FIG. 16 shows a schematic circuit diagram of another configuration of the teachings disclosed herein enabling the use of the SICI line for an alternate test/diagnosis function enabled by SICI interface commands. In this configuration, the connection 150 is used for a data transmission from the slave component 1660 to the master component 1610 regarding an alternate test/diagnosis function enabled by SICI interface commands. The slave component 1660 comprises a switch 1684 for either connecting the input amplifier 163 and the output driver 164 or the one or more components providing the alternate test/diagnosis function to the input/output 162 and thus the connection 150. As in the case of FIG. 15 the switch 1684 may be controlled via the SICI connection 150. After the alternate test/diagnosis function has been activated by means of a particular command transmitted to the slave component 1660 via the SICI connection 150, the slave component 1660 may return automatically to the normal SICI operation after a predetermined time. Within the master component 1610 the input amplifier 118 is configured to relay the test/diagnosis data received from the slave component 1660 for further processing.

Figure 17:
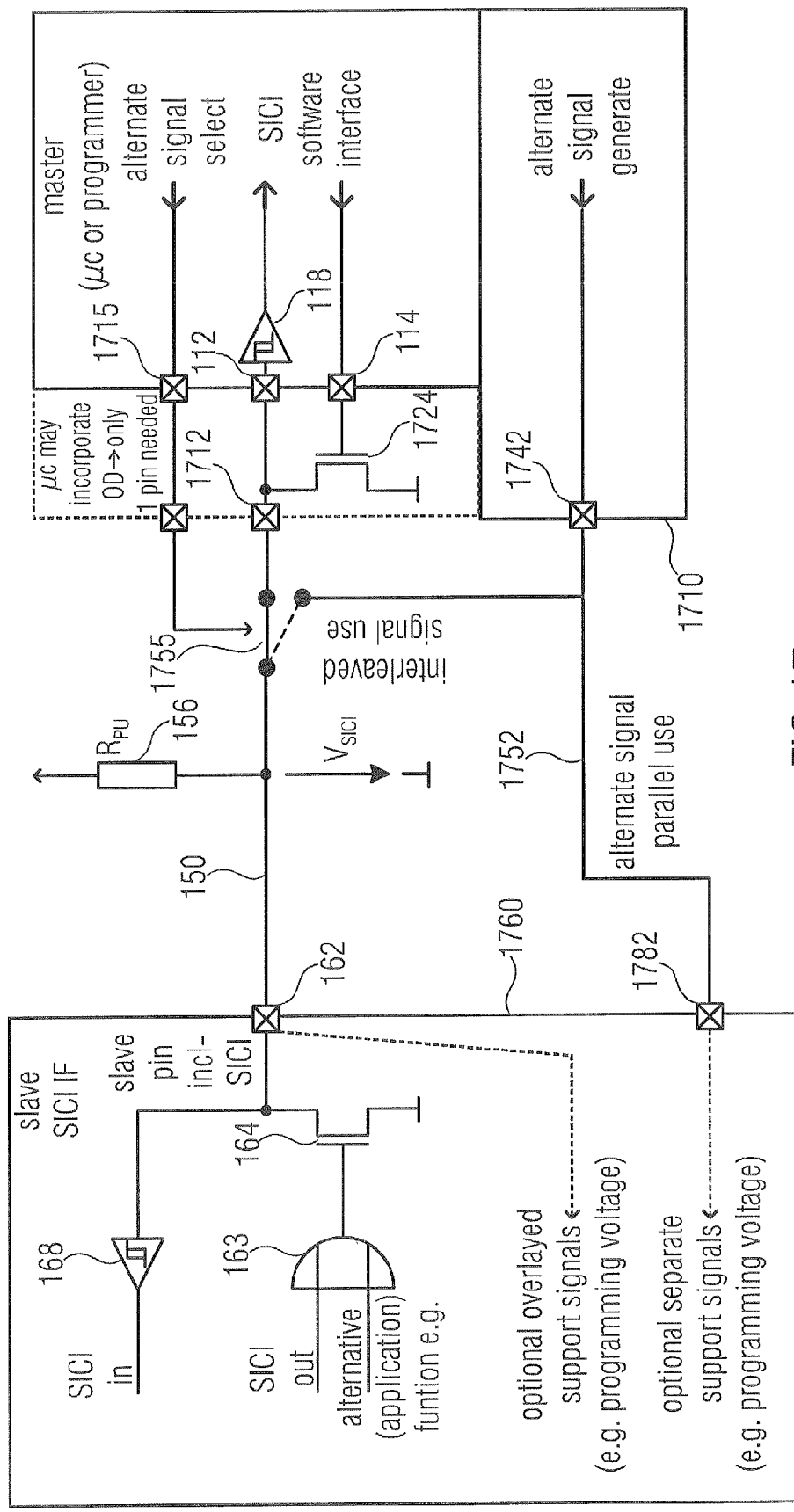
FIG. 17 shows a schematic circuit diagram according to another embodiment of the teachings disclosed herein.

FIG. 17 shows a schematic circuit diagram according to another embodiment of the teachings disclosed herein. More specifically, FIG. 17 shows a principle master/slave configuration with extended functions. A connection 150 is provided in order to allow a data transmission between a master component 1710 and a slave component 1760. The master component 1710 may be a micro controller (μC) or a programmer which is used to program an internal EEPROM (electrically erasable programmable read only memory) within the slave component 1760. The slave component 1760 may be, for example, a sensor or another peripheral device. Notwithstanding, the slave component 1760 may be any electronic device that comprises a suitable interface for the connection 150 to the master component 1710. The interface is called SICI (serial inspection/configuration interface) and is configured to decode transmission signals arising over the connection 150 from the master component 1710 and, optionally, to transmit data to the master component 1710. Although the name "serial inspection/configuration interface" might imply that its main field of application is in the context of inspecting and configuring the slave component, the teachings disclosed herein are not limited to such applications. Rather, the proposed data transmission scheme could be used for a wide range of applications, such as smart cards, portable memory devices, remote controls, etc.

The master component 1710 may comprise an output driver 1724 in the form of field effect transistors. If this is the case, only one input/output is needed for inputting and outputting the transmission signal to/from the master component 1710. In contrast, if the output driver is external to the master component 1710, an output 114 for the gate driver signal for the output driver is needed, as well as an input 112 for the input amplifier 118.

Furthermore, the master component 1710 may comprise an output 1742 for an alternate signal generated within the master component 1710. The alternate signal may be, for example, a programming voltage for an EEPROM of the slave component 1760. The alternate signal output 1742 may be connected to a corresponding alternate signal input 1782 of the slave component 1760 via an alternate signal line 1752 (labeled "alternate signal parallel use").

The alternate signal line 1752 may be dispensed with if another option is implemented called "interleaved signal use". In case the interleaved signal use option is implemented, the connection 150 comprises a switch or multiplexer 1755. In a first position the switch 1755 connects the input/output port 1712 of the master component 1710 with the input/output port 162 of the slave component 1760. In the other position, the switch 1755 connects the alternate signal output 1742 of the master component 1710 with the input/output port 162 of the slave component 1760. The switch 1755 may be controlled by an alternate signal select output by the master component 1710 via an output 1715. Within the slave component 1760 the alternate signal transmitted via the connection 150 may be branched out from the usual signal path to other subunits of the slave component 1760, so that optional overlayed support signals (e.g. programming voltage) may reach the intended subunit (for example, an EEPROM). In case the other option is implemented employing the alternate signal line 1752, optional separate support signals such as the EEPROM programming voltage may be transmitted over the alternate signal line 1752 to provide a parallel use of the connection 150 and the alternate signal connection 1752 instead of an interleaved signal use of the connection 150, only.

Figure 18:
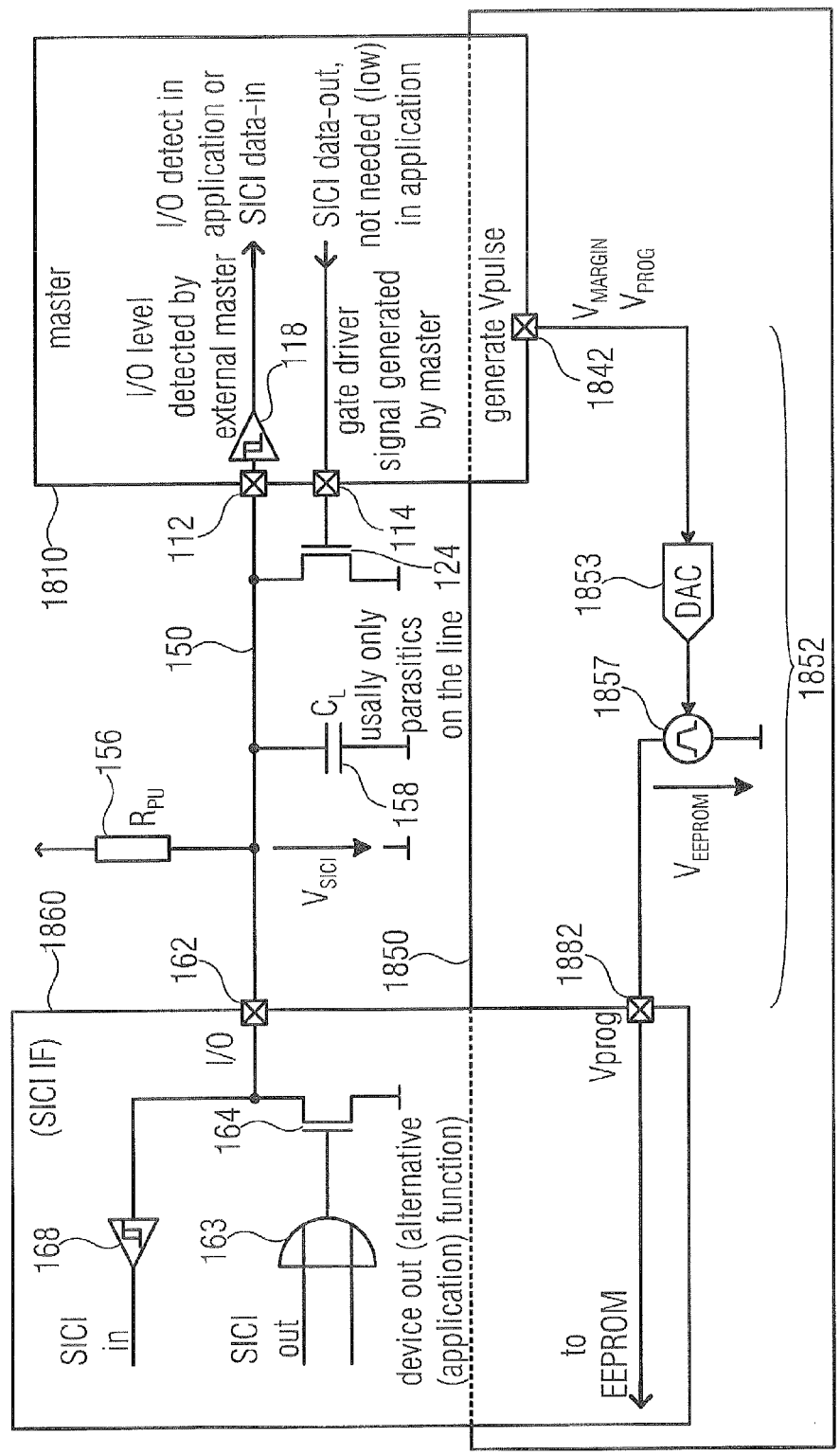
FIG. 18 shows a schematic circuit diagram of another configuration of the teachings disclosed herein.

FIG. 18 shows a schematic circuit diagram of another configuration of the teachings disclosed herein. With respect to a data communication over the SICI interface, i.e. the connection 150, the master component 1810 and the slave component 1860 are substantially identical to the master component 110 and the slave component 160 shown in FIG. 1. The load capacitance $C_L$ 158 is explicitly depicted in FIG. 18. As explained above, the load capacitance $C_L$ is usually caused by parasitics on the electrical conductor of the connection 150. Nevertheless, a dedicated capacitor could be provided, for example, in order to stabilize or smooth the voltage $V_{SICI}$ on the electrical conductor of the connection 150.

In addition to what is shown in FIG. 1, the master 1810 illustrated in FIG. 18 comprises circuitry configured to generate a voltage pulse (Vpulse), for example, to be used as a programming voltage for an EEPROM within the slave component 1860 or connected thereto. The voltage pulse is output by the master component 1810 at an output 1842 as a digital signal. The digital signal may represent a margin voltage $V_{MARGIN}$ or the programming voltage $V_{PROG}$ in an alternating manner. The output 1842 is connected to a digital-to-analog converter (DAC) 1853 that converts the digital signal to an analog signal. The analog signal output by the DAC 1853 controls a pulse voltage source 1857. The pulse voltage source 1857 generates a voltage $V_{EEPROM}$ which is applied to an input 1882 of the slave component 1860. Internally, the slave component 1860 applies the voltage $V_{EEPROM}$ to the EEPROM. The (imaginary) box 1850 in FIG. 18 contains the elements which are employed for EEPROM programming.

As shown in FIG. 18, additional lines may be used (as indicated by the box 1850) in order to provide, for example, the programming voltage ($V_{EEPROM}$) for a programming interface. The SICI would, in general, be capable of transmitting this functionality on the single line 150, as well (in a time multiplexed manner, that is in the phases in which the single connection interface is "passively" driven using the pull-up resistor 156, only). The interleaved signal use option shown in FIG. 17 illustrates how such a time multiplexing of communication signals and programming voltage on the connection 150 may be implemented.

Regarding the application side of the teachings disclosed herein, different scenarios for implementing the teachings disclosed herein in systems are possible in order to support features such as "in-circuit programming", "in-circuit debugging", or "in-circuit evaluation". The FIGS. 19 to 22 illustrate four of these scenarios. Note that an SPI connection which may possibly be present is not shown in FIGS. 19 to 22.

Figure 19:
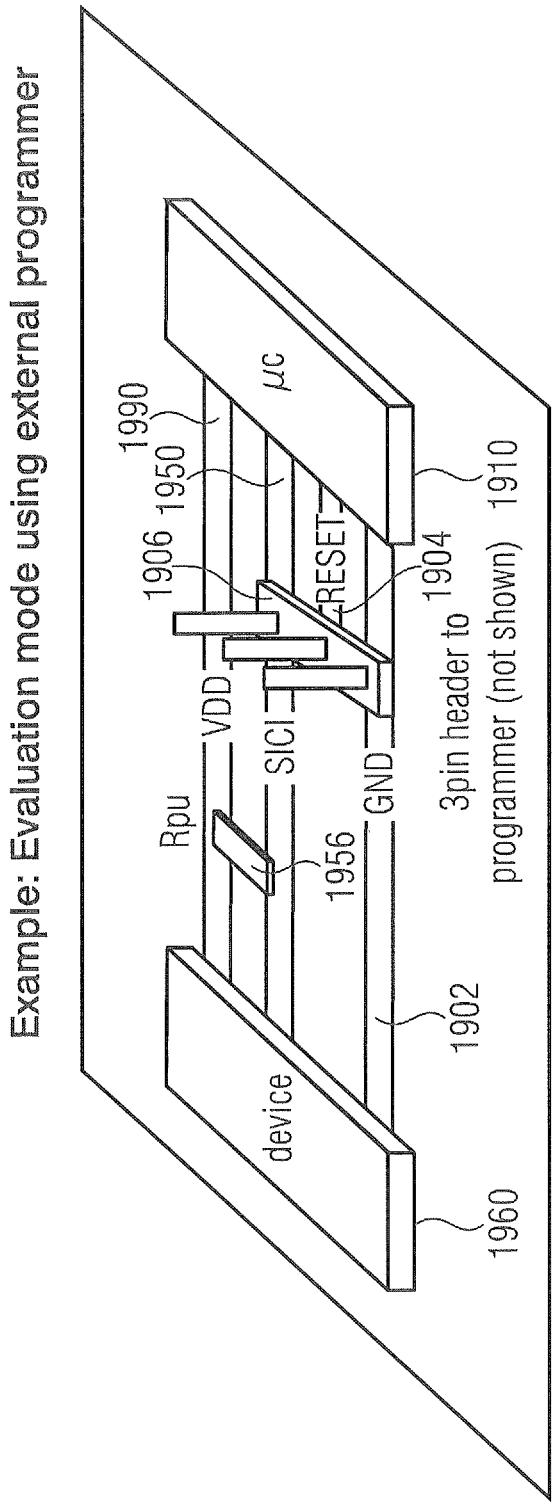
FIG. 19 illustrates an evaluation mode using an external programmer.

FIG. 19 illustrates an evaluation mode using an external programmer (not shown). A device 1960 is connected to a component microprocessor (μC) 1910 by means of a supply connection VDD 1990, a ground connection GND 1902 and a single data line 1950 labeled "SICI" and corresponding to the electrical conductor of the connection 150 shown in FIG. 1, for example. The microprocessor 1910 is configured to primarily function as a master component and the device 1960 is configured to primarily function as the slave component. Note however that the master configuration and the slave configuration of the microprocessor 1910 and the device 1960 may be changed during the operation of the arrangement shown in FIG. 19. The pull-up resistor 1956 is connected between the supply connection 1990 and the single data line 1950. A 3-pin header 1906 is configured to enable a tapping of the single data line 1950 and the ground connection 1902. Furthermore, the 3-pin header is connected to a reset line 1904 by means of which the master component 1910 can be reset following a corresponding reset signal generated by the external programmer. The reset line 1904 is provided to disable the master component 1910 while the external programmer accesses the slave component 1960. Another purpose of the reset line 1904 is to restart the master component 1910 after a change of the settings of the slave component 1960 has been done.

While the external programmer is connected to the 3-pin header 1906, the master component 1910 is operated in an open drain mode. When the external programmer is connected to the slave component via the 3-pin header, the external programmer may assume the role of the master component and control the data transmission to/from the slave component 1960 instead of the usual master component 1910. Accordingly, the external programmer may comprise a data communication device as outlined above and configured to functions as a master component. In the alternative, the device 1960 could function as the master component and the external programmer could function as the slave component.

Figure 20:
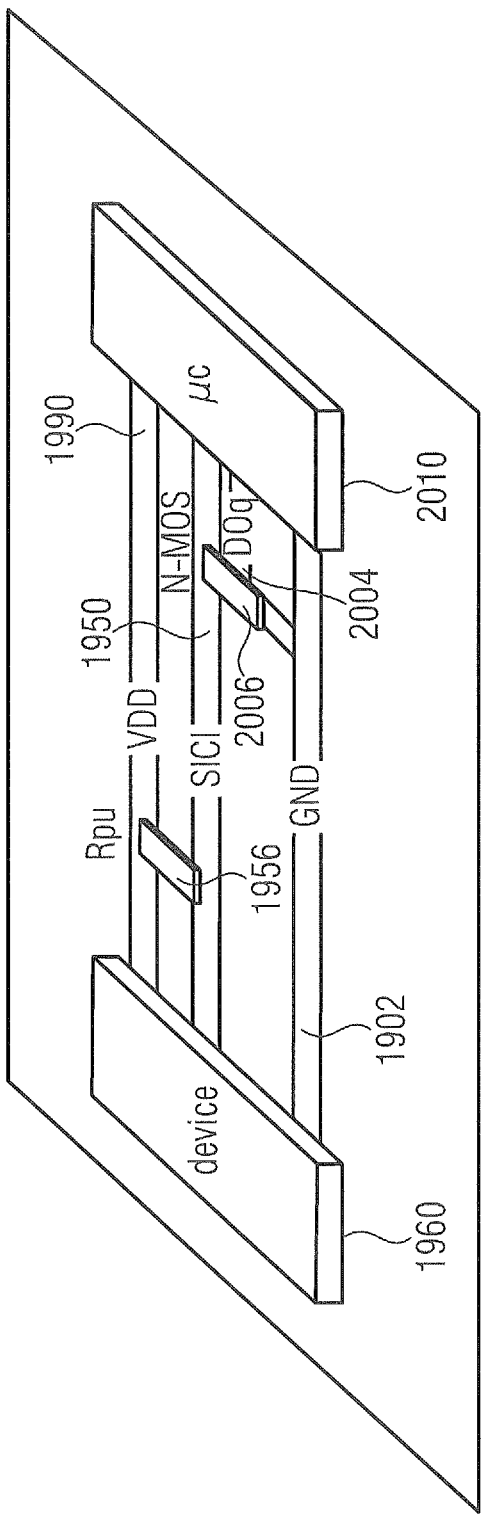
FIG. 20 illustrates an evaluation mode using an application micro controller (μC)

FIG. 20 illustrates an evaluation mode using an application micro controller (μC) as the master component 2010. A single line "master" communication is generated by the micro controller 2010. An N-MOS field effect transistor 2006 is connected to the single data line 1950 "SICI" at its drain terminal and to the ground connection 1902 at its source terminal. The gate terminal of the N-MOS field effect transistor 2006 is connected to the micro controller 2010 via a gate connection 2004 so that the μC 2010 may control the field effect transistor 2006. The N-MOS field effect transistor is typically only populated on boards that are used for evaluation.

Figure 21:
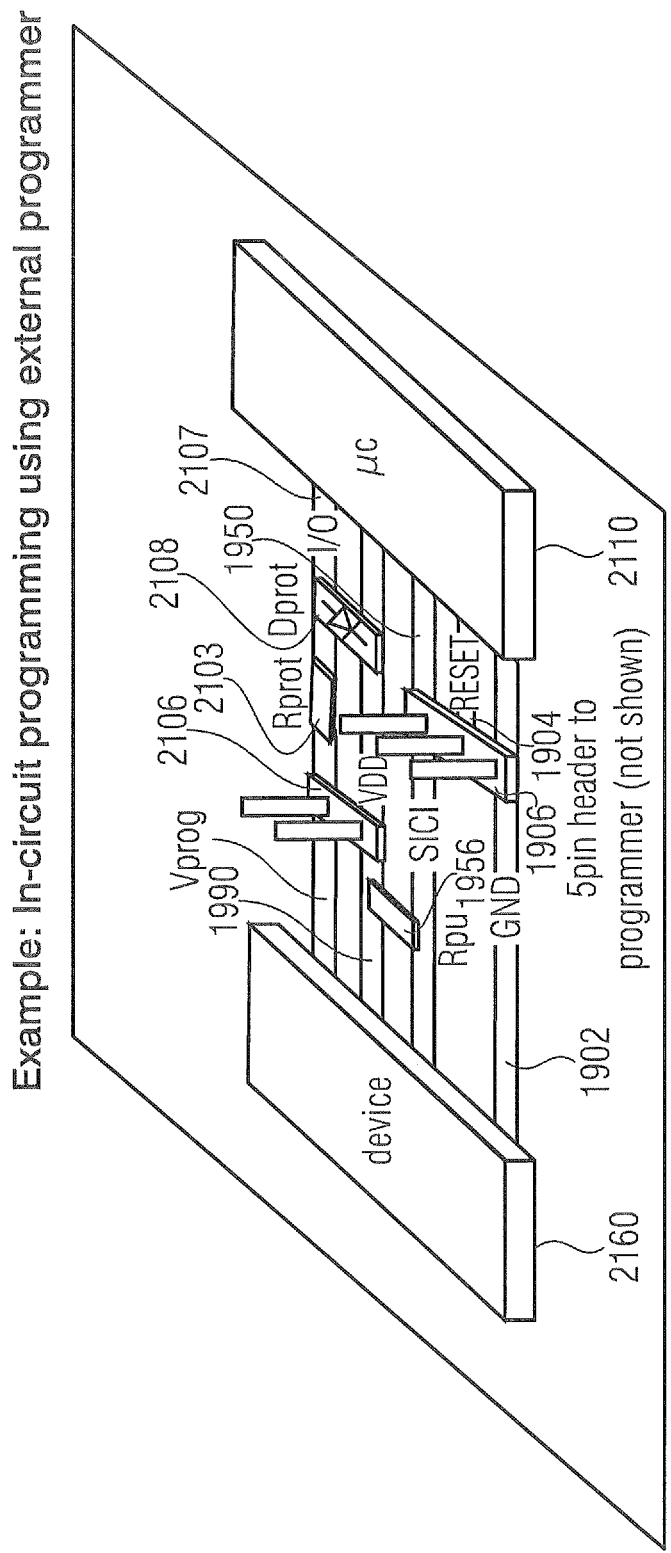
FIG. 21 illustrates a configuration to be used for in-circuit programming using an external programmer.

FIG. 21 illustrates a configuration prepared for in-circuit programming using an external programmer (not shown). The scenario illustrated in FIG. 21 is based on the evaluation mode using an external programmer illustrated in FIG. 19. Furthermore, a line labeled "Vprog" and a line 2107 labeled "I/O" are provided. The line "I/O" 2107 is connected to a pin of the microprocessor 2110. The line "Vprog" is connected to the device 2160. A protective resistor Rprot 2103 is connected in series with the I/O-connection 2107 and the Vprog line. A protective diode Dprot 2108 is connected between the line I/O 2107 and the supply connection 1990.

The external programmer may be connected to the circuit via a 5-pin header. The 5-pin header comprises two, parts. A first part of the 5-pin header corresponds to the 3-pin header shown in FIG. 19. A second part 2106 of the header comprises two further pins and provides an access to the supply voltage VDD and to the device 2160 via the Vprog line.

The protective resistor 2103 and the protective diode 2108 are typically needed to protect the micro controller 2110 against a programming voltage applied to the slave component 2160 during in-circuit programming. The protective diode 2108 might not be populated later on. The protective diode 2108 may be a diode against the supply voltage VDD (as shown) or a Zener diode against ground 1902. The selection of the diode type and how it is connected depends on the output ratings of the micro controller 2110.

Figure 22:
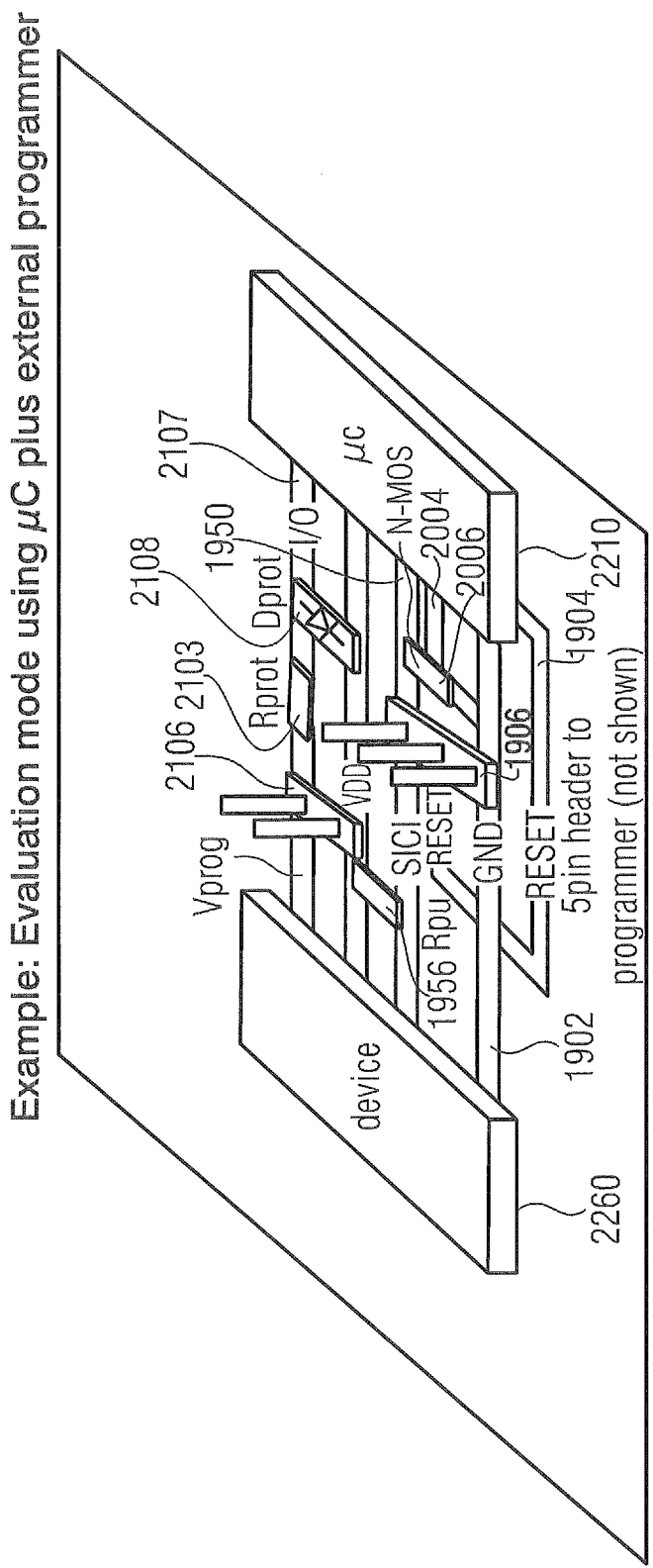
FIG. 22 illustrates an evaluation mode using a micro controller plus external programming.

FIG. 22 illustrates an evaluation mode using a micro controller plus external programming. The configuration shown in FIG. 22 is substantially a combination of the configurations shown in FIGS. 20 and 21. Thus, reference is made to the corresponding description of FIGS. 20 and 21. The master component has the reference numeral 2210 and the slave component has the reference numeral 2260.

Figure 23:
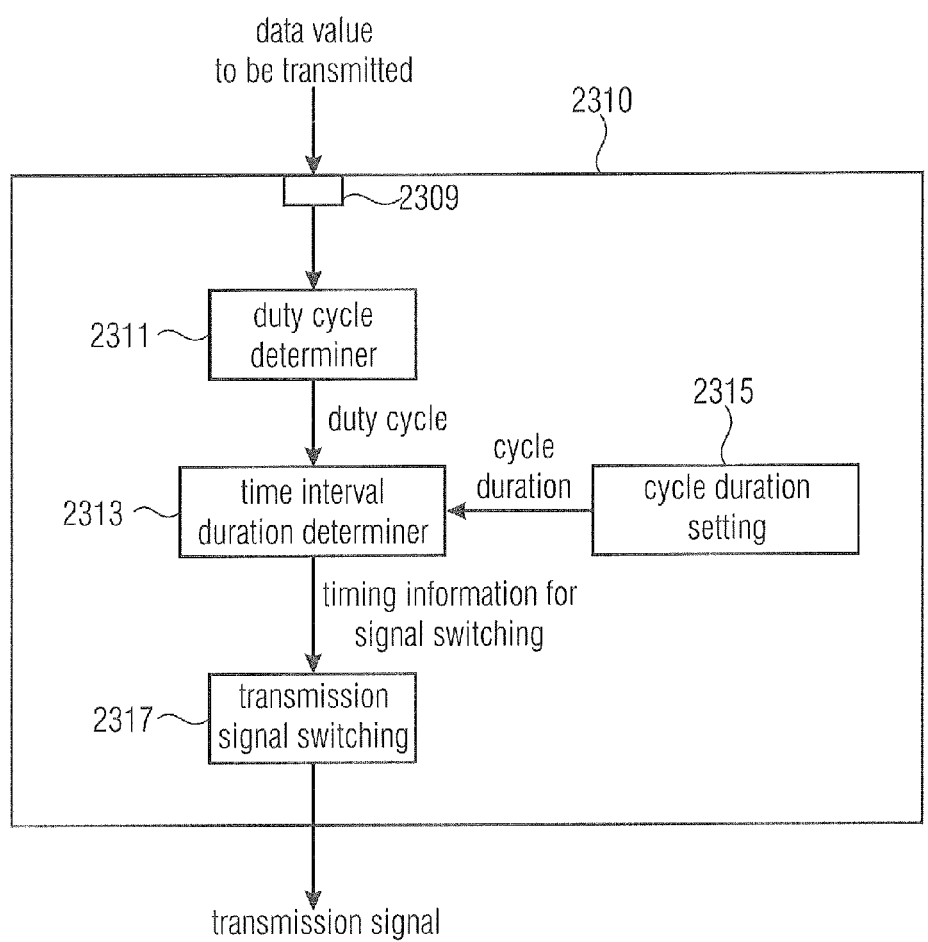
FIG. 23 shows a schematic block diagram of a data communication device according to an embodiment of the teachings disclosed herein.

FIG. 23 shows a schematic block diagram of a data communication device 2310 (such as the master component described above) according to an embodiment of the teachings disclosed herein. The data communication device receives a data value to be transmitted at the data value input 2309. Within the data communication device 2310 the data value is forwarded to a duty cycle determiner 2311. The duty cycle determiner 2311 is configured to determine a duty cycle of a pulse width modulation cycle. The duty cycle corresponds to the data value to be transmitted and indicates a ratio of a first time interval and a second time interval duration. The duty cycle determiner 2311 is configured to forward the determined duty cycle to a time interval duration determiner 2313. Another input for the time interval duration determiner 2313 is provided by a cycle duration setting device 2315, which is configured to set the cycle duration for an upcoming transmission of the data value by a transmission equipment, i.e., the data communication device 2310.

The time interval duration determiner 2313 uses the duty cycle provided by the duty cycle determiner 2311 and the cycle duration provided by the cycle duration setting device 2315 to determine the duration of the first time interval and the second time interval. A corresponding timing information for signal switching is output by the time interval duration determiner 2313 to a transmission signal switching device 2317 that is configured to switch a transmission signal from a first signal value to a second signal value and vice versa. The transmission signal switching device is controlled by the time duration determiner with respect to the duration of the first time interval and the second time interval. The first time interval is delimited by a first switching event at a start of the first time interval and a second switching event at the end of the first time interval. The first and second switching events are performed by the transmission signal switching device 2317. The second time interval is between the second switching event and the third switching event performed by the transmission signal switching device 2317. The switching events may be rising and falling edges of the transmission signal. The transmission signal switching device 2317 may comprise an output driver such as the output driver 124 shown in FIG. 1.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. A method of receiving a data transmission, the method comprising:
    detecting a first switching of a transmission signal to a first signal value, the first switching corresponding to an edge of the transmission signal;
    starting a measurement of a duration of a first time interval that begins with the detecting of the first switching of the transmission signal;
    detecting a second switching of the transmission signal to a second signal value, stopping the measurement of the duration of the first time interval and starting a second measurement of a duration of a second time interval;
    detecting a third switching of the transmission signal to the first signal value or to a third signal value, and stopping the second measurement in response to detecting the third switching;
    determining a relation of the durations of the first time interval and the second time interval from the first measurement and the second measurement; and
    determining a data value of the transmission signal based on the determined relation of the durations of the first time interval and the second time interval.

2. The method according to claim 1, further comprising:
    setting a duration of a third time interval subsequent to the second time interval based on the durations of the first time interval and the second time interval; and
    transmitting a response signal during the third time interval.

3. The method according to claim 2, wherein the duration of the third time interval is determined and set as an absolute value related to a difference of the durations of the first time interval and the second time interval.

4. The method according to claim 1, wherein the measurement of the duration of the first time interval comprises counting time units and wherein the measurement of the duration of the second time interval comprises counting time units, wherein determining the relation between the durations of the first time interval and the second time interval comprises determining whether a first time unit count is larger than a second time unit count, the first time unit count corresponding to a number of time units within the first time interval and the second time unit count corresponding to a number of time units within the second time interval.

5. The method according to claim 4, wherein during the first time interval the time units are counted in a first direction up from an initial time unit count to the first time unit count, and wherein during the second time interval the time units are counted, starting from the first time unit count, in a second direction opposite to the first direction, the method further comprising:
    determining whether at the end of the second time interval the second time unit count is higher or lower than the initial time unit count at a start of the first time interval in order to determine the relation of the durations of the first time interval and the second time interval.

6. The method according to claim 1, further comprising:
    receiving a polling request from a remote transmission equipment;
    determining whether data to be transmitted to the remote transmission equipment is available; and
    transmitting a positive response to the polling request to the remote transmission equipment during a third time interval subsequent to the second time interval if data to be transmitted is available.

7. The method according to claim 6, wherein a transmission frame of the data transmission comprises the first time interval, the second time interval and the third time interval, the method further comprising:
    receiving a data request from the remote transmission equipment after the positive response has been transmitted;
    ascertaining whether the data request comprises an identification matching a local equipment identification; and
    transmitting the available data to the remote transmission equipment during one or more third time intervals of one or more transmission frames subsequent to a completion of the data request.

8. A method of data transmission, the method comprising:
    setting a cycle duration for an upcoming transmission of a data value by a transmission equipment;
    determining a relation between durations of a first time interval and a second time interval based on the data value to be transmitted;
    determining the durations of the first time interval and the second time interval based on the cycle duration and the relation;
    switching a transmission signal to a first signal value to create an edge of the transmission signal;
    holding the first signal value during the first time interval;
    switching the transmission signal to a second signal value to create another edge of the transmission signal;
    holding the second signal value during the second time interval; and
    switching the transmission signal to the first signal value or a third signal value to indicate an end of the second time interval to a reception equipment configured to detect the edges of the transmission signal caused by the switching of the transmission signal.

9. The method according to claim 8, further comprising:
receiving a response signal from the reception equipment during a third time interval subsequent to the second time interval.

10. The method according to claim 9, further comprising:
determining a duration of the third time interval as a function of the durations of the first time interval and the second time interval.

11. The method according to claim 10, wherein a duration of the third time interval is substantially equal to an absolute value of a difference between the durations of the first time interval and the second time interval.

12. The method according to claim 8, wherein the first time interval and the second time interval form a pulse width modulation cycle, a duty cycle of the pulse width modulation cycle corresponding to a ratio of the durations of the first time interval and the second time interval and being representative of the data value to be transmitted by the transmission equipment.

13. The method according to claim 8, further comprising:
transmitting a polling request from the transmission equipment to the reception equipment;
determining whether the reception equipment has sent a response to the polling request;
transmitting a data request relative to requested data to the reception equipment if the reception equipment has sent a positive response to the polling request; and
receiving the requested data from the reception equipment.

14. The method according to claim 13, wherein the polling request is transmitted to at least one further reception equipment, wherein the data request to the reception equipment comprises an identification of the reception equipment.

15. A data communication device comprising:
a transmission signal input configured to receive a transmission signal emitted by a remote data communication device;
an edge detector configured to detect at least one of a leading edge and a trailing edge of a signal value of the transmission signal;
a counter configured to count in a first direction upon reception of a leading edge of the transmission signal and to count in a second direction opposite to the first direction upon reception of a trailing edge of the transmission signal;
a state machine configured to identify at least a first time interval and a second time interval of a pulse width modulation cycle, the first time interval being delimited by a leading edge and a trailing edge of the transmission signal and the second time interval being delimited by the trailing edge of the transmission signal and a further leading edge of the transmission signal, or vice versa;
a counter evaluator configured to determine whether a counter value of the counter at an end of the second time interval is above or beneath an initial counter value at the start of the first time interval, and derive a data value to be transmitted from the remote data communication equipment to the data communication equipment from the fact that the counter value at the end of the second time interval is above or beneath the initial counter value.

16. The data communication device according to claim 15, wherein the state machine is further configured to control the counter to count, at the end of the second time interval, in the second direction starting from the counter value that has been reached at the end of the second time interval to the initial value, the data communication device further comprising:
a transmission signal switching device configured to switch a back transmission signal from a second signal value to a first signal value, the back transmission signal to be transmitted from the data communication device to the remote data communication device during the third time interval, the transmission signal switching device being further configured to set the signal value of the back transmission signal based on a data value to be transmitted from the data communication device to the remote data communication device.

17. The data communication device according to claim 16, wherein a duration of the third time interval is determined as an absolute value of the difference between the durations of the first and second time intervals.

18. A data communication device comprising:
a transmission signal input configured to receive a transmission signal emitted by a remote data communication device;
an edge detector configured to detect at least one of a leading edge and a trailing edge in the transmission signal;
a duty cycle evaluator configured to receive an edge detection information from the edge detector enabling a determination of a relation of a duration of a first time interval and of a duration of a second time interval of a pulse width modulation cycle within the transmission signal, the duty cycle evaluator being further configured to determine a duty cycle information based on the durations of the first time interval and the second time interval; and
a data value provider configured to provide a data value transmitted to the data communication device via the transmission signal based on the determined duty cycle information.

19. A data communication device, comprising:
a means for receiving a transmission signal emitted by a remote data communication device;
a means for detecting an edge in the transmission signal;
a means for determining a duty cycle of a pulse width modulation cycle within the transmission signal based on an edge detection information provided by the means for detecting an edge, the duty cycle being representative of a ratio of durations of two time intervals that are delimited by edges within the transmission signal;
a means for determining a relation of the duty cycle and a threshold;
a means for providing a data value transmitted to the data communication device via the transmission signal based on the determined relation of the duty cycle and the threshold.

20. A data communication device, comprising:
a data value input configured to receive a data value to be transmitted by the data communication device;
a cycle duration setting device configured to set a cycle duration for an upcoming transmission of a data value by a transmission equipment;
a duty cycle determiner configured to determine a duty cycle of a pulse width modulation cycle, the duty cycle corresponding to the data value to be transmitted and indicating a ratio of a first time interval duration and a second time interval duration;
a time interval duration determiner configured to determine the durations of the first time interval and the second time interval based on the determined duty cycle and the determined cycle duration; and
a transmission signal switching device configured to cause a switching of a transmission signal from a first signal value to a second signal value and vice versa, the transmission signal switching device being controlled by the time duration determiner with respect to the durations of the first time interval and the second time interval, the first time interval being between a first switching event and a second switching event performed by the transmission signal switching device and the second time interval being between the second switching event and a third switching event performed by the transmission signal switching device.

21. The data communication device according to claim 20, further comprising:
a transmission signal output configured to be connected to a remote data communication device via an electrical connection, wherein an electrical potential on the electrical connection is representative of the transmission signal;
wherein the transmission signal switching device comprises a switching element configured to selectively apply an electrical potential on the electrical connection in response to a switching element control signal based on the duty cycle determined by the duty cycle determiner.

22. The data communication device according to claim 21, wherein the switching element is connected between the electrical connection and a reference potential, and wherein a pull-up resistor is connected between the electrical connection and a supply potential so that the switching element is configured to apply the reference potential on the electrical connection when the switching element is in a conducting state and that the supply potential is applied on the electrical connection due to an action of the pull-up resistor when the switching element is in a non-conducting state.

23. The data communication device according to claim 20, further comprising:
a timer configured to provide a time base for the data communication device;
wherein the duty cycle determiner is configured to determine the durations of the first time interval and the second time interval to be multiples of a basic time unit provided by the timer.

24. The data communication device according to claim 20, further comprising:
a transmission signal input configured to receive an arriving transmission signal from a remote data communication device and determine a signal value of the arriving transmission signal;
wherein the duty cycle determiner is further configured to enable the transmission signal input during a third time interval subsequent to the second time interval in order to receive and process a data communication within the arriving transmission signal from the remote data communication device to the data communication device.

25. The data communication device according to claim 24, wherein the duty cycle determiner is further configured to determine a duration of the third time interval as a function of the durations of the first time interval and the second time interval.

26. The data communication device according to claim 20, further comprising a programming voltage generator configured to generate a programming voltage for an electrically erasable programmable read-only memory (EEPROM), the electrically erasable programmable read-only memory being associated with a remote data communication device that is connected to the data communication device by means of an electrical connection.

27. The data communication device according to claim 26, wherein the programming voltage generator and the transmission signal switching element are both connected to the electrical connection between the data communication device and the remote data communication device so that the electrical connection is shared between data communication purposes and purposes of programming the electrically erasable programmable read-only memory.

28. The data communication device according to claim 20, further comprising:
a polling request generator configured to generate a polling request to at least one remote data communication device, the polling request comprising a specific data value pattern to be processed by the duty cycle determiner for providing a corresponding control signal sequence to the transmission signal switching device, the control signal sequence comprising a plurality of data values to be transmitted successively;
a polling response evaluator configured to receive and evaluate a polling response from the at least one remote data communication device, the polling response indicating whether the at least one remote data communication device has data available to be communicated from the at least one remote data communication device to the data communication device.

* * * * *